United States Patent
Seki et al.

(10) Patent No.: US 7,806,172 B2
(45) Date of Patent: Oct. 5, 2010

(54) VEHICLE AIR CONDITIONER

(75) Inventors: Hideki Seki, Toyoake (JP); Yoshiharu Okawa, Kariya (JP); Takayuki Shimauchi, Kariya (JP)

(73) Assignee: Denso Corporation, Kariya (JP)

( * ) Notice: Subject to any disclaimer, the term of this patent is extended or adjusted under 35 U.S.C. 154(b) by 498 days.

(21) Appl. No.: 11/881,174

(22) Filed: Jul. 26, 2007

(65) Prior Publication Data

US 2007/0266721 A1 Nov. 22, 2007

Related U.S. Application Data

(62) Division of application No. 10/700,721, filed on Nov. 4, 2003, now abandoned.

(30) Foreign Application Priority Data

Nov. 5, 2002 (JP) .............................. 2002-321267

(51) Int. Cl.
B60H 1/00 (2006.01)

(52) U.S. Cl. ...................... 165/202; 165/204; 165/42; 165/43; 454/121; 454/126; 454/156; 454/160; 454/161; 237/12.3 A; 237/12.3 B

(58) Field of Classification Search ................... 165/42, 165/43, 202, 204; 454/121, 126, 156, 160, 454/161; 237/12.3 A, 12.3 B
See application file for complete search history.

(56) References Cited

U.S. PATENT DOCUMENTS

| | | | |
|---|---|---|---|
| 5,699,851 A | 12/1997 | Saida et al. | |
| 5,899,806 A | 5/1999 | Hase et al. | |
| 6,029,739 A | 2/2000 | Izawa et al. | |
| 6,261,172 B1 * | 7/2001 | Shibata | 454/121 |
| 6,598,670 B1 | 7/2003 | Hashimoto et al. | |

(Continued)

FOREIGN PATENT DOCUMENTS

EP 1 247 668 A2 10/2002

(Continued)

OTHER PUBLICATIONS

Search Report in the corresponding FR application No. 03 12949 dated Nov. 29, 2006.

(Continued)

*Primary Examiner*—John K Ford
(74) *Attorney, Agent, or Firm*—Harness, Dickey & Pierce, PLC

(57) ABSTRACT

An air-outlet mode selecting device includes first and second rotary doors. Each of the first and second rotary doors has rotary shafts separated from each other in an axial direction of the rotary shafts, an outer peripheral door surface that is provided at a position separated radial outward from the center line of the rotary shafts and is turned with the rotary shafts, and left and right side plates for connecting both ends in the axial direction of the outer peripheral surface and the rotary shafts. One of the first and second rotary doors opens and closes a specified opening among three openings and other rotary door opens and closes the remaining two openings among the three openings. Accordingly, door operation force and air flow resistance can be effectively reduced, and the size of the air-outlet mode selecting device can be effectively reduced.

6 Claims, 23 Drawing Sheets

FACE MODE

U.S. PATENT DOCUMENTS 6,796,368 B1   9/2004   Saida et al.

FOREIGN PATENT DOCUMENTS

| | | |
|---|---|---|
| FR | 2 762 888 A1 | 11/1998 |
| FR | 2 778 148 A1 | 11/1999 |
| FR | 2 778 151 A1 | 11/1999 |
| JP | 05-058143 | 3/1993 |
| JP | 5-58143 | 3/1993 |
| JP | 07-101223 | 4/1995 |
| JP | 10-166839 | 6/1998 |
| JP | 11-115457 | 4/1999 |
| JP | 2001-150926 | 6/2001 |
| JP | 2002307929 A * | 10/2002 |
| JP | 2004-082845 | 3/2004 |

OTHER PUBLICATIONS

Office Action dated Jun. 15, 2007 from corresponding JP Application No. 2002-321267.

* cited by examiner

FOOT MODE

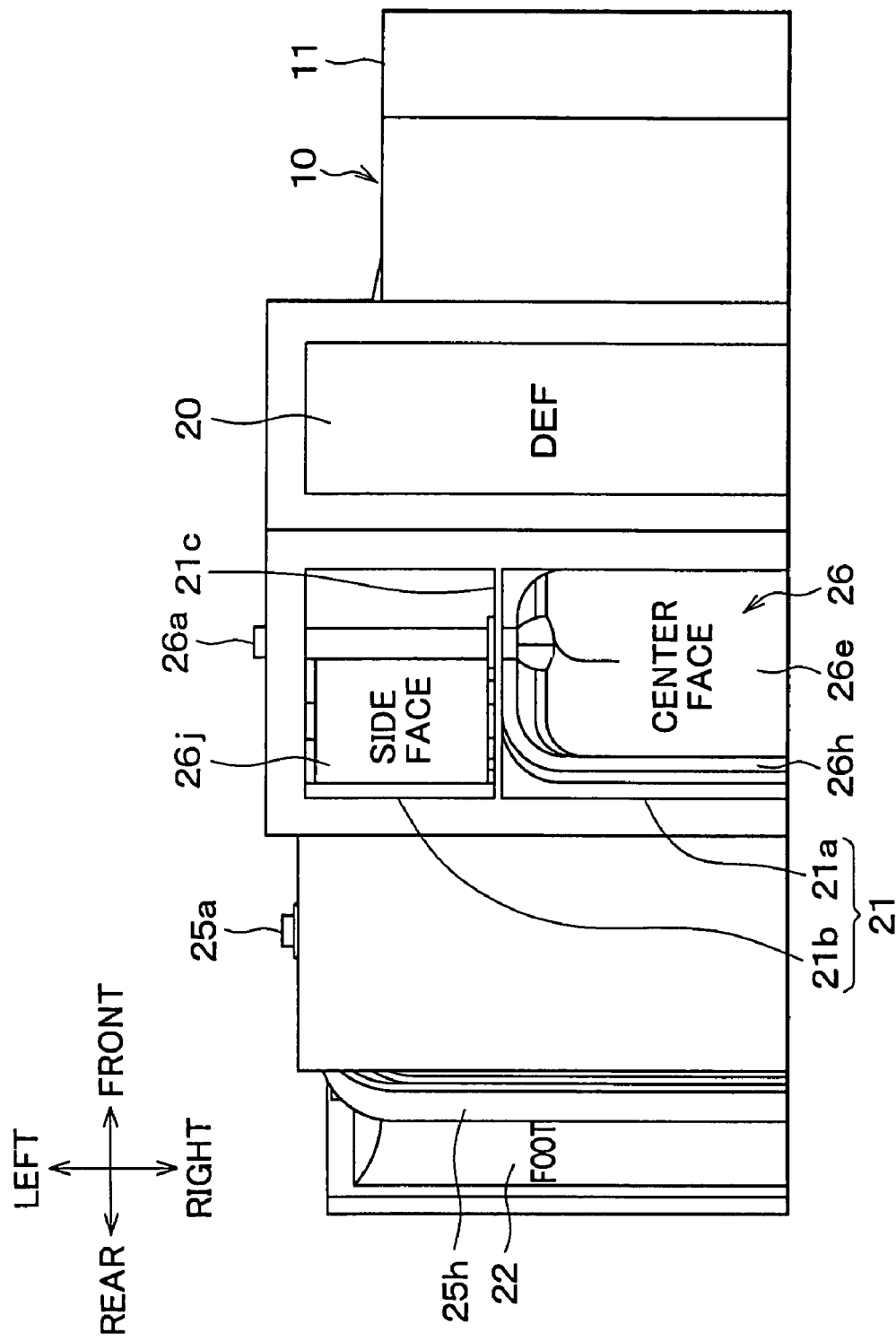

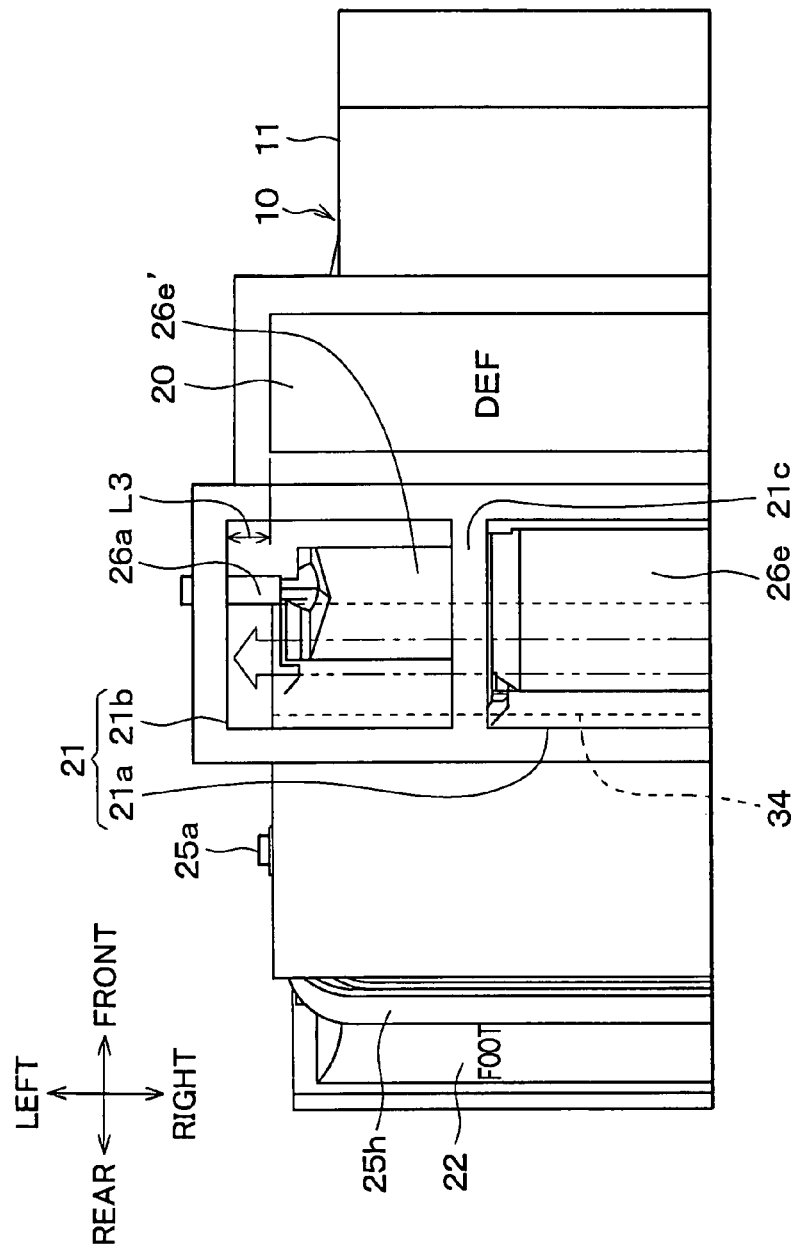

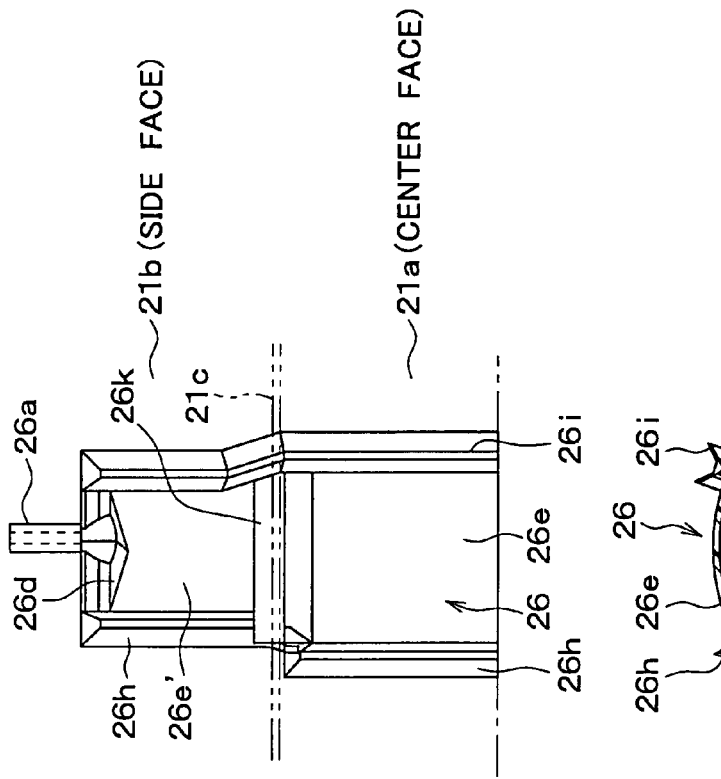
FIG. 17A
FIG. 17B
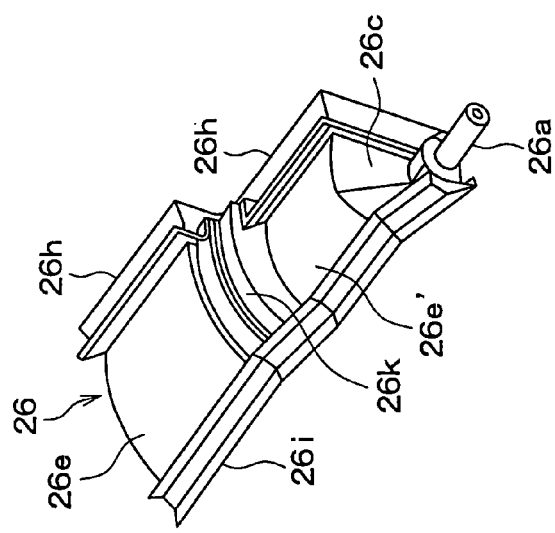
FIG. 17C

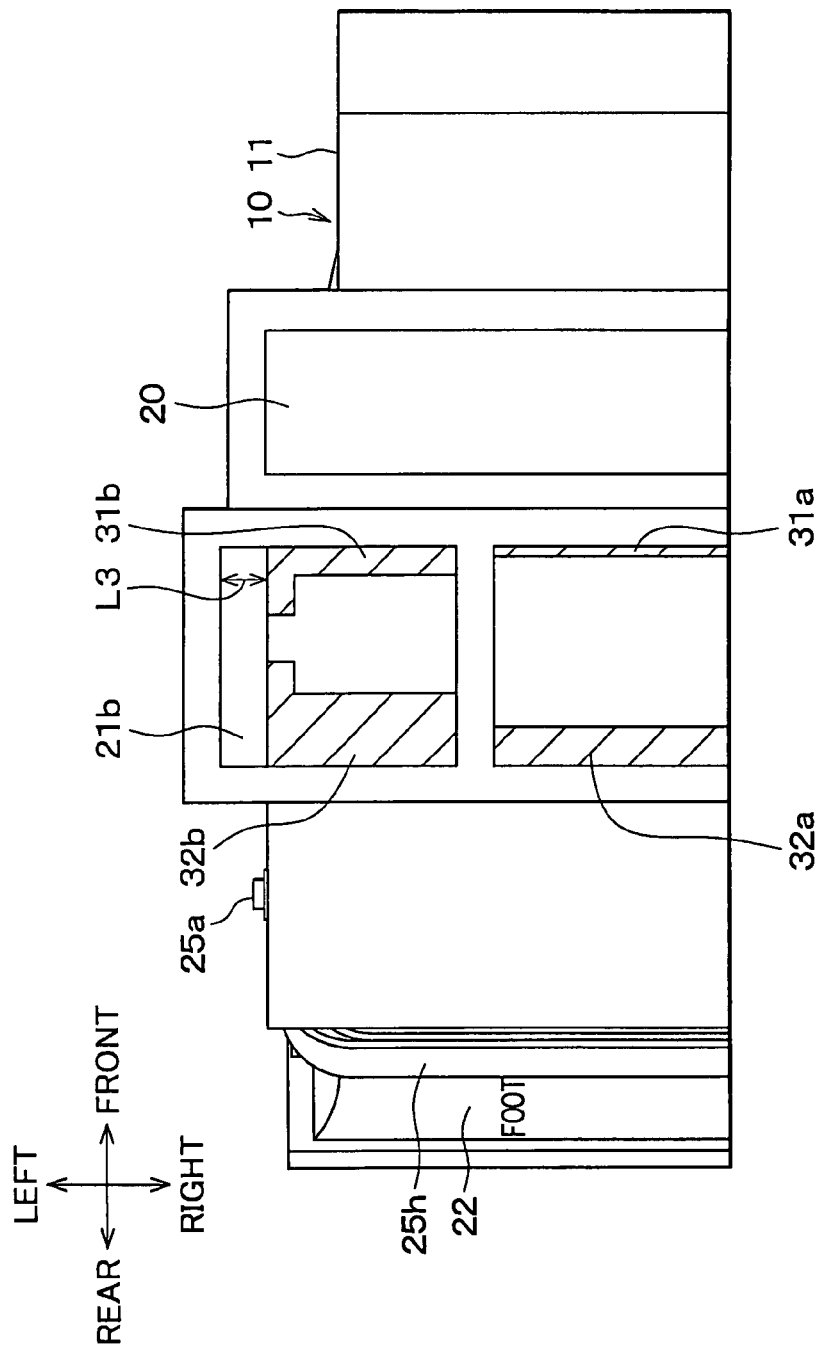

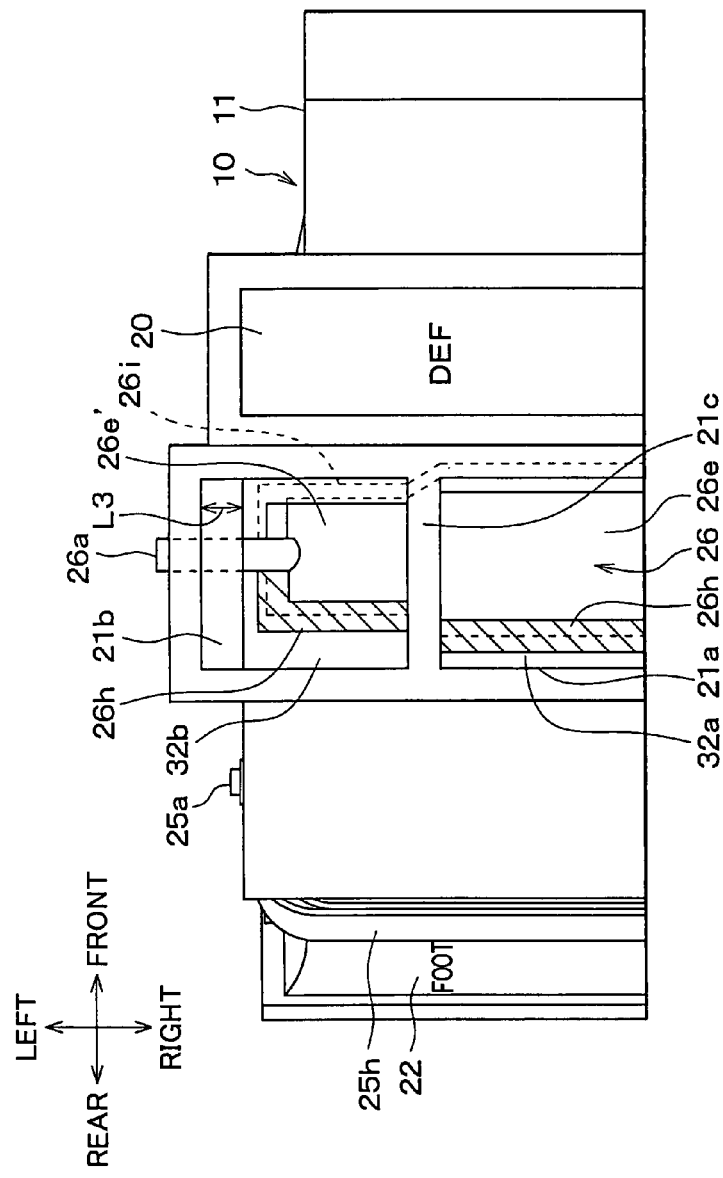

VEHICLE AIR CONDITIONER

CROSS-REFERENCE TO RELATED APPLICATIONS

This application is a divisional of U.S. patent application Ser. No. 10/700,721 filed on Nov. 4, 2003. This application is based on Japanese Patent Application No. 2002-321267 filed on Nov. 5, 2002, the disclosure of which is incorporated herein by reference.

BACKGROUND OF THE INVENTION

1. Field of the Invention

The present invention relates to a vehicle air conditioner including an air-outlet mode selecting device for opening and closing air outlet openings. The air-outlet mode selecting device includes two rotary doors each of which has an outer peripheral door surface turning with a rotary shaft.

2. Related Art

An air-outlet mode selecting mechanism for opening and closing air outlet openings in an air conditioner for a vehicle is broadly divided into the following three types of air-outlet mode selecting devices. The first type of air-outlet mode selecting device, as shown in FIG. 22, opens and closes a defroster opening 20, a face opening 21 and a foot opening 22 by the use of a face/defroster selector door 110 made of a cantilever plate door and a foot door 100 made of a cantilever plate door. Here, the plate-shaped foot door 100 is provided with a rotary shaft 100a at one end thereof and is turned around the rotary shaft 100a. Similarly, the plate-shaped face/defroster selector door 110 is provided with a rotary shaft 110a at one end thereof and is turned around the rotary shaft 110a.

The second type of air-outlet mode selecting device, as shown in FIG. 23, opens and closes the defroster opening 20, the face opening 21 and the foot opening 22 by the use of a foot door 100, a face door 110 and a defroster door 120 each of which is made of a butterfly door. Here, the butterfly door 100 is provided with a rotary shaft 100a at the center thereof and is turned around the rotary shaft 100a. Similarly, the butterfly door 110 is provided with a rotary shaft 110a at the center thereof and is turned around the rotary shaft 110a, and the butterfly door 120 is provided with a rotary shaft 120a at the center thereof and is turned around the rotary shaft 120a.

The third type of air-outlet mode selecting device opens and closes the face opening 21, the defroster opening 20 and the foot opening 22 by the use of a single rotary door having an outer peripheral door surface turning with a rotary shaft. Further, the outer peripheral door surface turning with the rotary shaft is arranged at a position separated by a predetermined distance outward in the radial direction from the center of the rotary shaft. This outer peripheral door surface is usually shaped like an arc having its center at the rotary shaft.

In the first type of air-outlet mode selecting device, the defroster/face selector door 110 and the foot door 100 are respectively constructed of the cantilever plate doors, so the doors 100, 110 need to be operated against the pressure of blowing air applied to the whole surface of the plate door. Further, there are cases where the doors 100, 110 need to be operated against their self-weights. As described above, because the doors 100, 110 need to be operated against the pressure of blowing air and the self-weight, the first type of air-outlet mode selecting device presents a problem that a door operating force becomes large.

In the second type of air-outlet mode selecting device, the three doors 100 to 120 are constructed of the butterfly doors. The butterfly door has the rotary shaft at the center of the door plate, so the force applied to one side of the door plate by the air pressure and the self-weight is opposite to the force applied to the other side of the door plate by the air pressure and the self-weight. Therefore, the second type of air-outlet mode selecting device has an advantage of canceling effects of the air pressure and the self-weight, thereby reducing the door operating force as compared with the first type of air-outlet mode selecting device. However, when the butterfly door is used, the door plate is located near the center of the air passage of the respective openings when the respective openings are fully opened (see door 110 in FIG. 23). Due to this construction, an air flow resistance increases, air blowing volume is reduced, and air blowing noises (whizzing noises) increase when the respective openings are fully opened. Then, in a case where the butterfly door is located directly behind an air mixing portion in which cold air and hot air are mixed with each other, there is a phenomenon in which the cold air and the hot air from the air mixing portion flow separately on the front surface side and the rear surface side of the door plate of the butterfly door. This presents a problem of increasing variations in the temperature of air to be blown into a passenger compartment.

According to the third type of air-outlet mode selecting device, the face opening 21, the defroster opening 20 and the foot opening 22 can be opened and closed by the single rotary door, so the third type of air-outlet mode selecting device has an advantage of reducing the number of doors and simplify a link mechanism for operating the doors as compared with the first and second types of air-outlet mode selecting devices. However, the third type of air-outlet mode selecting device, for the following reasons, deteriorates the mounting performance in a vehicle. That is, in the third type of air-outlet mode selecting device, all of the face opening, the defroster opening and the foot opening need to be arranged in an arc shape along the turning path of the outer peripheral door surface of the rotary door. On the other hand, the air conditioning unit is arranged in a place that is inside the instrument panel (i.e., dashboard) of the vehicle and is subjected to extreme spatial constraint. Thus, it is difficult to perform the arrangement of three air outlet openings of the face opening, the defroster opening and the foot opening in the shape of an arc.

Further, in order to ensure the respective air volumes blown off from the three air outlet openings, the areas of the respective air outlet openings need to be enlarged and hence the area of the outer peripheral door surface of the rotary door needs to be enlarged. As a result, the rotary door is increased in size, and the mounting performance of the air conditioning unit in the vehicle is further deteriorated.

SUMMARY OF THE INVENTION

In view of the above-described problems, it is an object of the present invention to provide an air-outlet mode selecting device of an air conditioner for a vehicle, which can reduce a door operating force and an air flow resistance, and can improve mounting performance of the air conditioner in the vehicle.

According to an aspect of the present invention, in an air conditioner for a vehicle, a heat exchanger for performing a heat exchange with air is disposed in a case for defining an air passage through which air flows into a passenger compartment. The case is provided with a defroster opening through which air flows toward an inner surface of a front windshield of the vehicle, a face opening through which air flows toward an upper side of the passenger compartment, and a foot opening through which air flows toward a lower side of the passenger compartment, at positions downstream from the heat exchanger. Further, the air conditioner is provided with an air-outlet mode selecting device for opening and closing the defroster opening, the face opening and the foot opening. In addition, the mode selecting device includes first and second rotary doors, and each of the first and second rotary doors includes a rotation shaft, an outer peripheral door surface separated from a center axial line of the rotation shaft to a radial outside by a predetermined dimension, and two side plates connected to the rotation shaft and end portions of the outer peripheral door surface in an axial direction of the rotation shaft. In the air conditioner, one of the first and second rotary doors is disposed to open and close one of the defroster opening, the face opening and the foot opening, and the other one of the first and second rotary doors is disposed to open and close the other two of the defroster opening, the face opening and the foot opening.

In each of the first and second rotary doors, the outer peripheral door surface is rotated around the rotation shaft in a direction perpendicular to an air flow direction. Accordingly, door operation force of the mode selecting device can be effectively reduced, and the size of the mode selecting device can be effectively reduced. Further, because each rotary door does not partition a hot air flow and a cool air flow, a temperature difference of air blown into each opening can be reduced. In addition, because both of the rotary doors are arranged to open and close the three openings, one of the three openings can be arbitrarily arranged relative to the other two of the three openings. Thus, the size of the mode selecting device constructed with the first and second doors can be effectively reduced, and mounting performance of the air conditioner using the mode selecting device can be improved.

Preferably, each of the first and second rotary doors is formed into a gate shape by the outer peripheral door surface and the two side plates to have an inner space of the gate shape through which air after passing through the heat exchanger flows. Further, the defroster opening, the face opening and the foot opening are arranged outside of the gate shapes of the first and second rotary doors, and each of the first and second rotary doors is provided with a seal portion on peripheral end portions of the outer peripheral door surface and the two side plates. In addition, the case has seal surfaces each of which is provided around each of the openings, and the seal portion of the rotary door press-contacts the seal surface of the case so that a communication between the inner space of the gate shape and each of the openings is shut. Therefore, a gate shape space can be constructed with the outer peripheral door surface and the two side plates in each of the first and second rotary doors.

More preferably, the heat exchanger includes a heating heat exchanger for heating air, and the heating heat exchanger is disposed in the case to form a hot air passage through which air passes the heating heat exchanger and a cold air passage through which air bypasses the heating heat exchanger. In this case, even when the foot opening is provided to be near the cold air passage than the hot air passage, because the air passage of the case is provided with a hot air bypass passage through which air in the hot air passage is branched into right and left sides of the cold air passage and is introduced into the foot opening. Therefore, a comfortable up and down temperature distribution of air to be blown into the passenger compartment can be provided.

According to another aspect of the present invention, the first rotary door is disposed to open and close the foot opening, and the second rotary door is disposed to open and close the defroster opening and the face opening. Further, the face opening is partitioned into a center face opening portion through which air is blown toward a center upper side of the passenger compartment in a width direction of the vehicle, and a side face opening portion through which air is blown toward a side upper side of the passenger compartment in the width direction. In the air conditioner, the second rotary door is disposed to maintain an open state of the side face opening portion even while closing the center face opening portion. Therefore, it is possible to always introduce air into the side face opening portion. Accordingly, air-conditioning feeling given to a passenger adjacent to a side windshield can be improved, and defogging performance of the side windshield can be improved.

BRIEF DESCRIPTION OF THE DRAWINGS

Other objects, features and advantages of the present invention will become more apparent from the following detailed description made with reference to the accompanying drawings, in which:

FIG. 13 is a top plan view of a left half portion of the air conditioning unit in accordance with the fifth embodiment;

FIG. 16 is a top plan view of a left half portion of the air conditioning unit in accordance with the sixth embodiment, when the foot mode is set in a state where air does not blow off from the defroster opening;

FIGS. 17A, 17B, 17C are a partial perspective view, a partial top plan view, and a cross-sectional view of the structure of a second rotary door, in accordance with the sixth embodiment, respectively;

FIG. 18 is a top plan view of a left half portion of the air conditioning unit in accordance with the sixth embodiment and shows a state where the second rotary door is dismounted;

FIG. 19 is a top plan view of the left half portion of the air conditioning unit in accordance with the sixth embodiment and shows a position relationship between the seal part of the second rotary door and a case side seal surface provided in a case;

DETAILED DESCRIPTION OF THE PREFERRED EMBODIMENTS

First Embodiment

The first embodiment of the present invention will be now described with reference to FIGS. 1-7.

Figure 1:
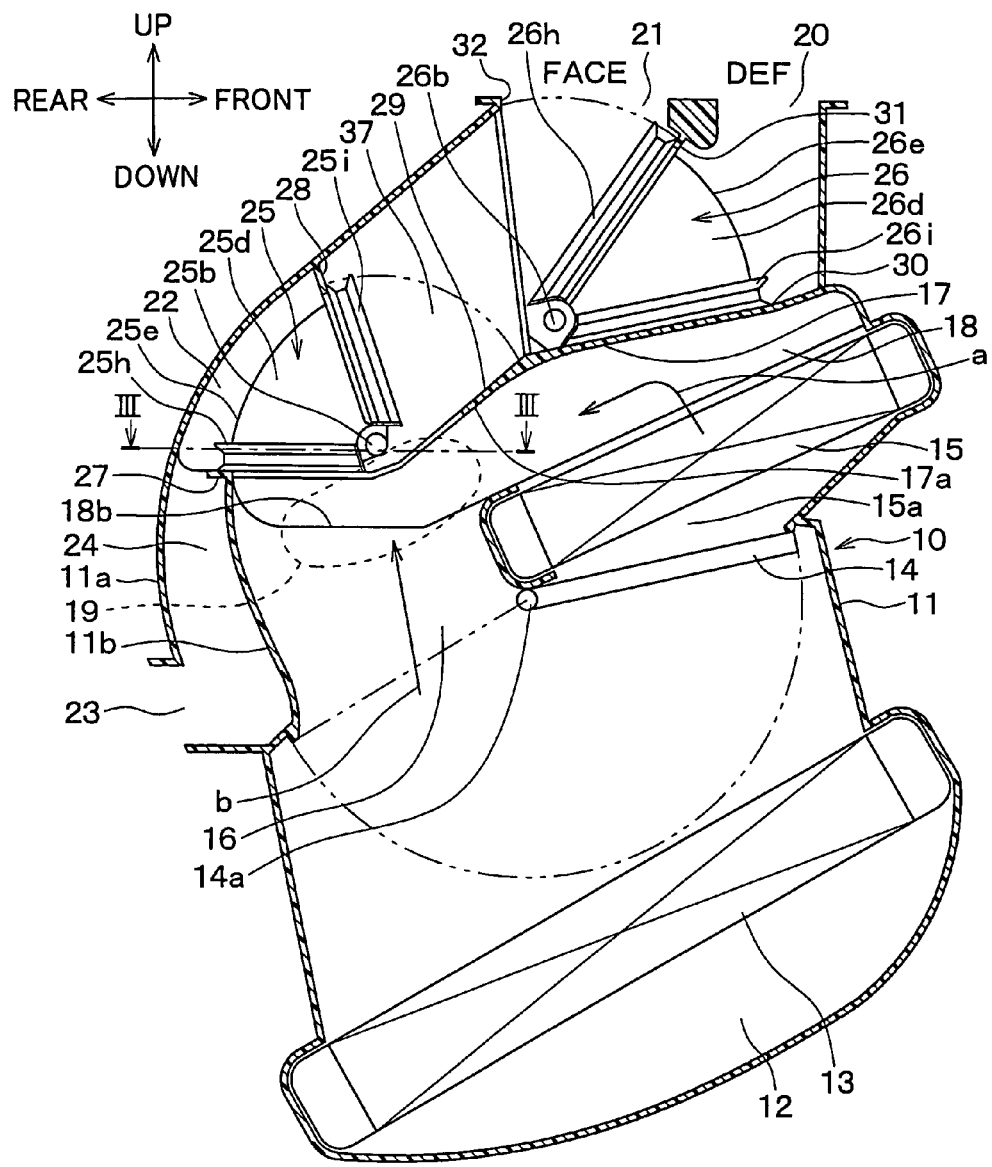
FIG. 1 is a longitudinal cross-sectional view of an air conditioning unit in a face mode, in accordance with a first embodiment of the present invention.

An air conditioning unit 10 shown in FIG. 1 is arranged nearly at the center in the width direction (right-left direction) of a vehicle inside an instrument panel (i.e., dashboard) at the front in a passenger compartment. The interior unit of an air conditioner for a vehicle is broadly divided into the above-described air conditioning unit 10 arranged nearly at the center and a blower unit (not shown) arranged in a position offset to a front passenger's seat in the width direction from the center inside the instrument panel.

The blower unit has an inside/outside air switching box for selectively introducing outside air (i.e., air outside the passenger compartment) and inside air (i.e., air inside the passenger compartment), and a centrifugal blower for blowing air introduced into this inside/outside air switching box. The air blown by this blower unit flows into a lowermost air inflow space 12 in a case 11 of the air conditioning unit 10.

The case 11 is formed of resin having an elasticity and a high mechanical strength, such as polypropylene. For convenience in releasing a molded product from a mold after molding air-conditioning parts in the case, the case 11 is divided into a plurality of split cases and then the plural split cases are integrally combined into one piece.

An evaporator 13 serving as a heat exchanger for cooling is arranged nearly in a horizontal direction to be inclined by a small inclined angle above the air inflow space 12 in the case 11 of the air conditioning unit 10. Thus, air blown from the blower unit flows into the air inflow space 12, and passes through the evaporator 13 upwardly from bottom to top. In the evaporator 13, as well known, low-pressure refrigerant reduced in pressure by a pressure reducing unit such as an expansion valve of a refrigeration cycle flows into the evaporator 13 and absorbs heat from the air, thereby being evaporated.

An air mixing door 14 and a hot water type heater core 15 serving as a heat exchanger for heating are arranged above the evaporator 13 (on a downstream side of air flow). The air mixing door 14 is constructed of a cantilever plate door pivoting on a rotary shaft 14a.

The heater core 15, as well known, heats air by using hot water (i.e., engine-cooling water) of a vehicle engine as a heat source. Then, this heater core 15 is also arranged approximately in a horizontal direction, that is, approximately in parallel to the evaporator 13. The heater core 15 is smaller in a cross-sectional area than an air passage in the case 11 and is arranged nearer to the front side of the vehicle in the case 11. With this arrangement, a cold air passage 16 through which air (cold air) bypassing the heater core 15 flows is formed on the rear side of the vehicle (i.e., position nearer to a passenger seat) of the heater core 15.

The air mixing door 14 is turned in a front-rear direction of the vehicle between the evaporator 13 and the heater core 15 to open or close an inlet air passage 15a of the heater core 15 and the cold air passage 16. By using this air mixing door 14, it is possible to adjust the air volume ratio between hot air (arrow "a") passing through the inlet air passage 15a and heated by the heater core 15, and cold air (arrow "b") passing through the cold air passage 16. Therefore, the temperature of air blown into the passenger compartment can be adjusted by operation of the air mixing door 14. Thus, a temperature adjustment unit for adjusting the temperature of air blown into the passenger compartment is constructed of the air mixing door 14.

The rotary shaft 14a of the air mixing door 14 is rotatably supported by bearing holes (not shown) made in left and right side walls of the case 11. One end of the rotary shaft 14a is protruded out from the case 11 and is connected to an air mixing door operating mechanism. An actuator mechanism using a motor is typically employed as this air mixing door operating mechanism, but in place of the actuator mechanism, a manually operated mechanism can be employed.

A hot air guide wall 17 is integrally molded with the case 11 at a specified spacing above the heater core 15, and a hot air passage 18 is formed between this hot air guide wall 17 and the top surface of the heater core 15. The hot air passing through the heater core 15 is guided by the hot air guide wall 17, thereby flowing through the hot air passage 18 toward the rear side of the vehicle as shown by arrow "a". A tip bent portion 17a that is bent downward is formed at a portion on the rear side of the vehicle of the hot air guide wall 17.

Since the hot air from the hot air passage 18 is guided downward in a slanting direction by the tip bent portion 17a, the hot air collides opposite to the cold air flowing upward through the cold air passage 16, as shown by arrow "b", thereby enhancing the mixing of the cold air and the hot air. An air mixing portion 19 where the cold air and the hot air are mixed is formed above the cold air passage 16.

A defroster opening 20 is open at a portion on the front side of the vehicle in the top surface of the case 11, and a face opening 21 is open at a portion on the rear side of the vehicle of the defroster opening 20 in the top surface of the case 11. Each of these defroster opening 20 and the face opening 21 is rectangular and, to be more specific, is shaped like a rectangle having long sides in the width direction of the vehicle and short sides in the front-rear direction of the vehicle.

The defroster opening 20 is made so as to blow off conditioned air from the air mixing portion 19 toward inside surface of the front windshield of the vehicle. Then, the face opening 21 is made so as to blow off conditioned air from the air mixing portion 19 toward the upper bodies of passengers.

Front seat side foot openings 22 are open at portions above the air mixing portion 19 in the side walls on both the left and right sides in the width direction of the vehicle of the case 11. These front seat side foot openings 22 on both the left and right sides are made so as to blow off conditioned air from the air mixing portion 18 toward the feet of passengers on the front seats (driver and passenger on the passenger seat). The front seat side foot opening 22 is shaped nearly like a triangle having a sharp top portion as shown in FIG. 4 to FIG. 7.

A rear seat side foot opening 23 is open in a wall surface 11a below the front seat side foot openings 22 and on the rear side of the vehicle of the case 11. This rear seat side foot opening 23 always communicates with the front seat side foot openings 22 through a rear seat side foot air passage 24. This rear seat side foot air passage 24 is formed between the wall surface 11a on the rear side of the vehicle of the case 11 and a wall surface 11b for defining the cold air passage 16. The wall surface 11b is located inside the wall surface 11a on the front side of the vehicle.

In this embodiment, an air-outlet mode selecting mechanism (i.e., mode selecting device) is constructed of first and second rotary doors 25, 26. The front seat side foot openings 22 are opened and closed by the first rotary door 25, and the defroster opening 20 and the face opening 21 are opened and closed by the second rotary door 26. A communication passage 37 is formed adjacent to the vehicle front side of the front seat side foot openings 22. The defroster opening 20 and the face opening 21 communicate with the air mixing portion 19 through this communication passage 37. The first rotary door 25 opens and closes also the communication passage 37 when it opens and closes the front seat side foot opening 22.

Figure 2:
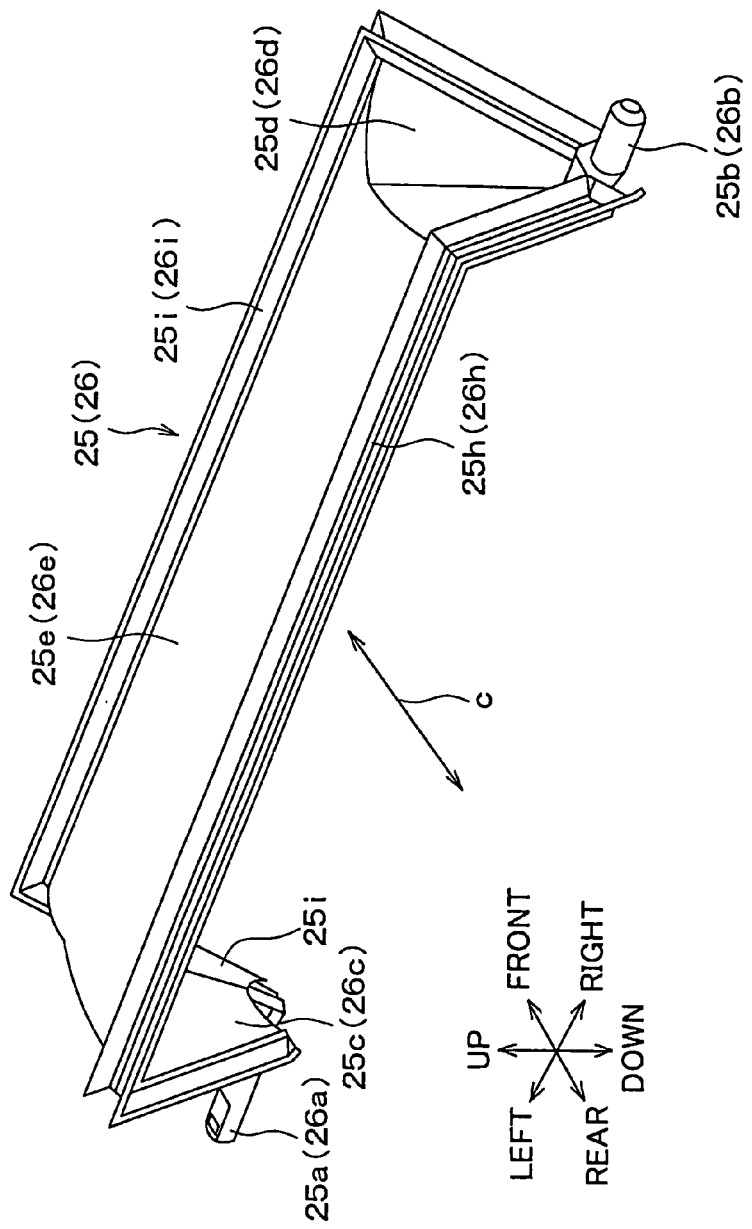
FIG. 2 is a perspective view showing a rotary door structure in the first embodiment.

The first and second rotary doors 25, 26 are different from each other in outside dimension and the like but are basically equal to each other in door construction. Hence, the first rotary door 25 is used as an example, and the rotary door construction will be now described in detail with reference to FIG. 2. As shown in FIG. 2, the first rotary door 25 is integrally constructed of left and right rotary shafts 25a, 25b, left and right fan-shaped side plates 25c, 25d, and an outer peripheral door surface 25e.

The left and right rotary shafts 25a, 25b are formed to protrude outside of the left and right sides at the pivots of the fan-shaped left and right side plates 25c, 25d, and are rotatably supported by the bearing holes (not shown) of the left and right side walls of the case 11. Then, the outer peripheral door surface 25e is joined to outer peripheral end portions of the left and right fan-shaped side plates 25c, 25d, so that the left and right fan-shaped side plates 25c, 25d and the outer peripheral door surface 25e are formed into a gate shape (like a horseshoe or a U-shape). A space inside the gate shape is always open to a space in the case 11, so air can freely pass through the space inside the gate shape in a direction shown by the arrow "c" (in a direction perpendicular to a direction of the rotary shaft).

In the example shown in FIG. 2, each of the left and right fan-shaped side plates 25c, 25d is formed to be slightly curved inside in the direction of the rotary shaft to increase its strength. Then, the outer peripheral door surface 25e is located at a position separated by a predetermined distance in the radial direction (outward in the radial direction) of the rotary shafts 25a, 25b from the centers of the rotary shafts 25a, 25b. Further, the outer peripheral door surface 25e is extended in a rotation direction of the rotary door 25 to have a predetermined wall area.

To be more specific, the outer peripheral door surface 25e of this embodiment is shaped, in cross section, like an arc having a center at the rotary shafts 25a, 25b, and is formed in flat shape into a rectangle having long sides in the width direction of the vehicle and short sides in the front-rear direction of the vehicle.

The first rotary door 25 including the rotary shafts 25a, 25b, the fan-shaped side plates 25c, 25d and the outer peripheral door surface 25e which have been described above is integrally molded of resin having high mechanical strength and a set elasticity, for example, polypropylene.

Next, a seal structure in the first rotary door 25 will now described. In this embodiment, a door seal structure is of the lip seal type so as to reduce a door operating force. Collar-shaped portions 25f, 25g (see FIG. 4 to be described later) are integrally molded to protrude outside on the surfaces of the outer peripheral door surface 25e and the side plates 25c, 25d that construct the door base parts of the door 25. Seal parts 25h, 25i are fixed to these collar-shaped portions 25f, 25g.

One seal part 25h is located at one end in the rotation direction of the door base part, and the other seal part 25i is located at the other end in the rotation direction of the door base part. Thus, both the seal parts 25h, 25i, as shown in FIG. 1 and FIG. 2, are formed in such a way as to expand in a V-shape from the pivots of the fans (positions where the rotary shafts 25a, 25b are arranged) of the side plates 25c, 25d, respectively.

Both of the seal parts 25h, 25i are made of elastic material and protruded outside in the shape of lip (thin plate) from the collar-shaped portions 25f, 25g. Both of the seal parts 25h, 25i are protruded in the V-shape in cross section from the surfaces of the collar-shaped portions 25f, 25g. As shown in FIG. 2, when being viewed from a direction of an air flow inside the rotary door shown by the arrow "I", both the seal parts 25h, 25i are formed into a gate shape (like a horseshoe) as its whole shape, just as with the whole shape of the rotary door 25.

Then, by using thermoplastic elastomer that can be molded similarly to thermoplastic resin at high temperatures whereas shows rubber elasticity at room temperature as a specific material for the seal parts 25h, 25i, both the seal parts 25h, 25i can be integrally molded and thereby fixed to the collar-shaped portions 25f, 25g while the door base part of the first rotary door 25 is molded. The rotary door 26 is formed into the shape of FIG. 2, similarly to the rotary door 25. The rotary door 26 includes rotary shafts 26a, 26b, fan-shaped side plates 26c, 26d and the outer peripheral door surface 26e.

In the case 11, seal surfaces 27, 28, 29 are integrally provided on portions on both front and rear sides in the front-rear direction of the vehicle of the front seat side foot opening 22 (portions on both front and back sides in the rotation direction in which the first rotary door 25) and on the upper surface of the tip bent portion 17a of the hot air guide wall 17 (see FIG. 1). The seal parts 25h, 25i of the first rotary door 25 are elastically deformed by and pressed onto the three seal surfaces 27, 28, 29, respectively.

Each of the three seal surfaces 27, 28, 29 is shaped like a gate corresponding to the whole gate shape of each of the seal parts 25h, 25i, so that the whole gate shape of each of the seal parts 25h, 25i press-contacts the three seal surfaces 27, 28, 29.

A the rear side portion (outside the door) of a lip portion forming the rear seal part 25h of the first rotary door 25 is pressed onto the rear side seal surface 27 located on the rear side in the front-rear direction of the vehicle (in the rotation direction) among the seal surfaces 27, 28, 29. Then, a middle seal surface 28 located at the middle in the front-rear direction of the vehicle (in the door rotation direction) forms seal surfaces on both the front and rear sides in the front-rear direction of the vehicle, and a rear side (inside the door) of a lip portion forming the front seal part 25i of the first rotary door 25 is pressed onto the front side surface of the middle seal surface 28.

When the front seat side foot opening 22 is fully opened (in a foot mode to be described later, see FIG. 5), a front side portion (inside the door) of a lip portion for forming the rear seal part 25h of the rotary door 25 is pressed onto the rear surface of the middle seal surface 28. Further, when the front seat side foot opening 22 is fully opened (see FIG. 5), the front side portion (outside the door) of a lip portion for forming the front seal part 25i of the first rotary door 25 is pressed onto the front seal surface 29 located on the front side in the front-rear direction (in the door rotation direction).

Figure 5:
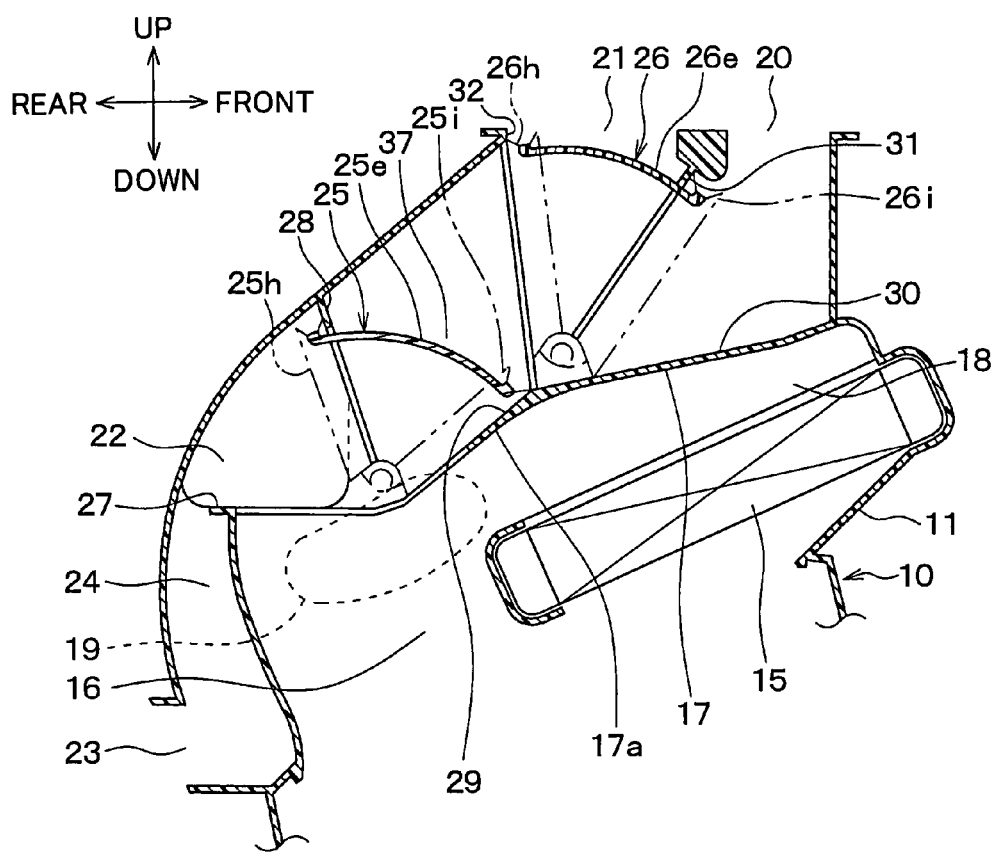
FIG. 5 is a cross-sectional view showing a main part in FIG. 1, in a foot mode.

FIG. 5 shows the foot mode where the first rotary door 25 totally closes the communication passage 37 and fully opens the front seat side foot opening 22.

Similarly, seal surfaces 30, 31, 32 (see FIG. 1) are integrally formed with the case 11 on the front side portion of the defroster opening 20 in the front-rear direction (in the door rotation direction), on a middle portion between the defroster opening 20 and the face opening 21, and on the rear side portion of the face opening 21 in the front-rear direction (in the door rotation direction), respectively. The seal parts 26h, 26i of the second rotary door 26 are elastically deformed by and pressed onto these three seal surfaces 30, 31, 32.

Among these three seal surfaces 30, 31, 32, each of the seal surfaces 31, 32 is shaped like a gate corresponding to the whole gate shape of each of the seal parts 26h, 26i, and the whole gate-shaped portion of each of the seal parts 26h, 26i is pressed onto each of the seal surfaces 31, 32.

The remaining seal surface 30 is formed on the top surface of the hot air guide wall 17 located at the lower portion of the defroster opening 20 and hence is shaped like a simple flat plane. The whole gate shape of the seal part 26i is also pressed onto the seal surface 30. To be more specific, a lip portion on the front side (outside) of an approximate V-shaped lip portion for forming the front seal part 26i of the second rotary door 26 is pressed onto the seal surface 30 as shown in FIG. 1.

The middle seal surface 31 located at the middle portion between the defroster opening 20 and the face opening 21 forms seal surfaces on both of the front and rear sides in the front-rear direction of the vehicle. A lip portion of on the front side (inside the door) of an approximate V-shaped lip portion for forming the rear side seal part 26h of the second rotary door 26 is pressed onto the rear side surface of the middle seal surface 31 as shown in FIG. 1.

When the face opening 21 is completely closed (see FIG. 5 to be described later), a lip portion on the rear side (inside the door) of the approximate V-shaped lip portion for forming the front seal part 26i of the second rotary door 26 is pressed onto the front surface of the middle seal surface 31. Further, when the face opening 21 is completely closed, a lip portion on rear side (outside the door) of the approximate V-shaped lip portion for forming the rear side seal part 26h of the second rotary door 26 is pressed onto the rear seal surface 32.

The first and second rotary doors 25, 26 construct an air-outlet mode selecting device for selecting an air outlet mode, and are operated in synchronization with each other by a common air-outlet mode door operating mechanism (not shown). To be more specific, any one of the rotary shafts 25a, 25b on both the left and right sides of the first rotary door 25 and any one of the rotary shafts 26a, 26b on both left and right sides of the second rotary door 26 are protruded outside any one of the left and right side walls of the case 11 and the protruded portions of these rotary shafts are connected to the common air-outlet mode door operating mechanism via a link mechanism. An actuator mechanism using a motor is typically used as this common air-outlet mode door operating mechanism. However, in place of the actuator mechanism, a manually operated mechanism can be used.

Figure 3:
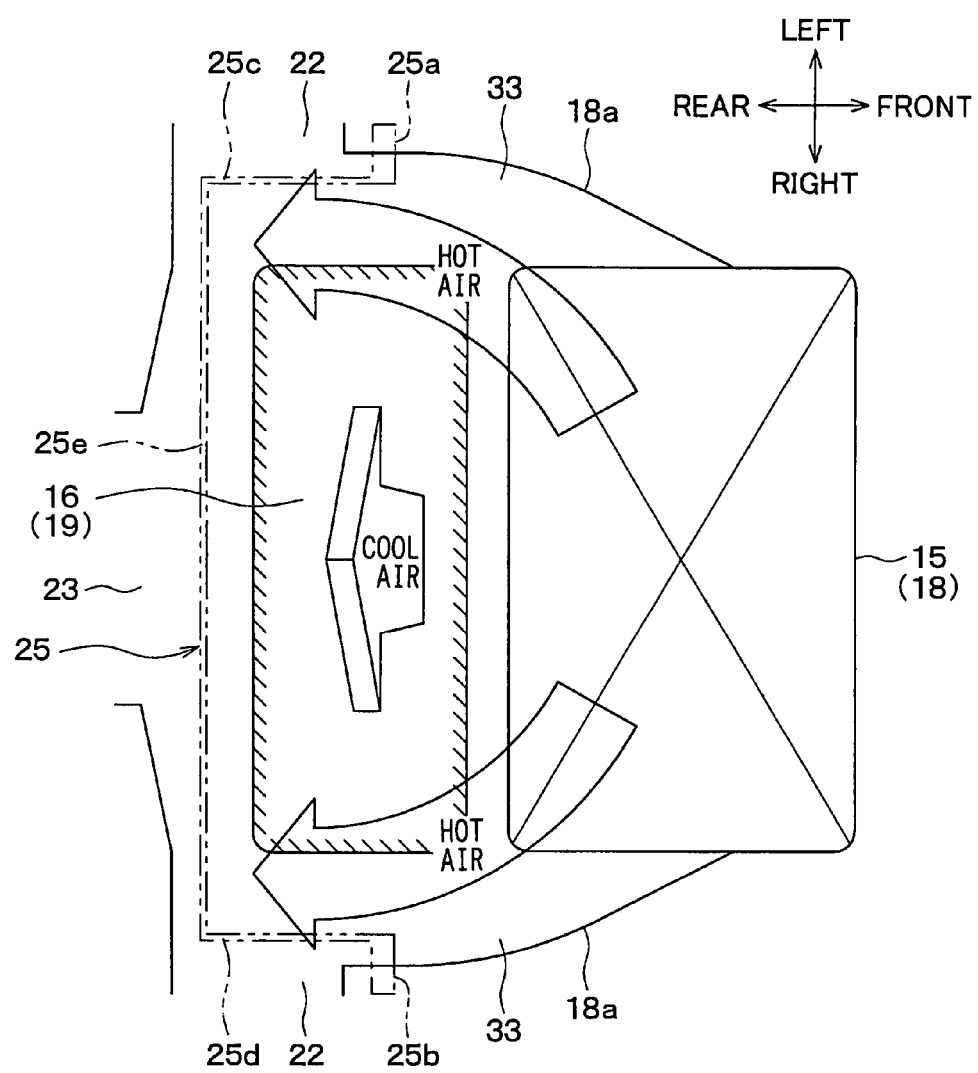
FIG. 3 is a cross-sectional view taken on the line III-III in FIG. 1, showing a hot air bypass passage.

Next, the construction of a hot air bypass passage for introducing hot air into the front seat side opening 22 will be described. FIG. 3 is a cross-sectional view taken on the line III-III in FIG. 1. A slanting surface 18a spreading outside in the left and right direction of the hot air passage 18 formed above the heater core 15 is integrally formed with the left and right side walls of the case 11. This slanting surface 18a is formed in the shape smoothly expanding outside in the left and right direction toward the rear side of the vehicle. This slanting surface 18a extends to pass the left and right outside portions of the air mixing portion 19 formed above the cold air passage 16, and extends toward the rear side of the vehicle.

The front seat side foot openings 22, 22 on the left and right sides are arranged at the portions extended to the vehicle rear side of the slanting surface 18a. With this arrangement, a hot air bypass passage 33 through which the left and right outside portions of the hot air passage 18 directly communicate with the front seat side foot openings 22, 22 can be formed inside the left and right portions of the slanting surface 18a. In FIG. 1, a surface 18b with a step is for forming a bottom surface of the hot air bypass passage 33 and protrudes outside to the left and right at a height position near the air mixing portion 19.

Next, the operation of the first embodiment will be described in the above-described construction of the air conditioner. FIG. 1 shows a state in a face mode in which both the front and rear seal parts 25h, 25i of the rotary door 25 in the rotation direction are elastically pressed onto the case side seal surfaces 27, 28 at the front and back of the front seat side foot openings 22, 22. Here, each of the seal surfaces 27, 28 has a gate shape (like a horseshoe, U-shape), and both the seal parts 25h, 25i each having the gate shape (a letter C) of the first rotary door 25 are pressed onto the whole seal surfaces 27, 28, respectively.

As a result, a communication between the inside space of the first rotary door 25 and the outside space of the first rotary door 25 is interrupted. The front seat side foot openings 22, 22 on the left and right sides communicate with the outside space shaped like a gate of the first rotary door 25, so the front seat side openings 22, 22 are brought by the first rotary door 25 into a state where they do not communicate with a passage on the upstream side of the first rotary door 25. That is, the front seat openings 22 are closed by the first rotary door 25.

At this time, the first rotary door 25 opens the communication passage 37, and the gate-shaped inside space of the first rotary door 25 makes a space through which an air mixing portion 19 communicates with the communication passage 37. Thus, air on the side of the air mixing portion 19 directly flows into the communication passage 37, and passes through the inside space of the first rotary door 25 and flows into the communication passage 37.

Then, in the face mode, both the seal parts 26h, 26i at the front and back in the rotation direction of the second rotary door 26 are elastically pressed onto the case side seal surfaces 31, 30, respectively. At this time, by the second rotary door 26, the defroster opening 20 is completely closed and the face opening 21 is fully opened. Thus, conditioned air from the communication passage 37 is blown off only from the face opening 21 toward the upper haft body of a passenger.

In FIG. 1, there is shown a maximum cooling state where the air mixing door 14 fully closes the inlet air passage 15a of the heater core 15 and fully opens the cold air passage 16 in the face mode. Thus, the whole volume of cold air cooled by the evaporator 13 passes through the cold air passage 16 and is blow from the face opening 21 toward the upper half body of the passenger.

Then, by turning the air mixing door 14 clockwise from the maximum cooling state shown by solid line in FIG. 1, the inlet air passage 15a of the heater core 15 is opened. For this reason, by adjusting the rotational position of the air mixing door 14, the air volume ratio between hot air heated by the heater core 15 and cold air passing through the cold air passage 16 can be adjusted, and the temperature of air blown toward the upper half body of the passenger can be adjusted to an arbitrary level.

Figure 4:
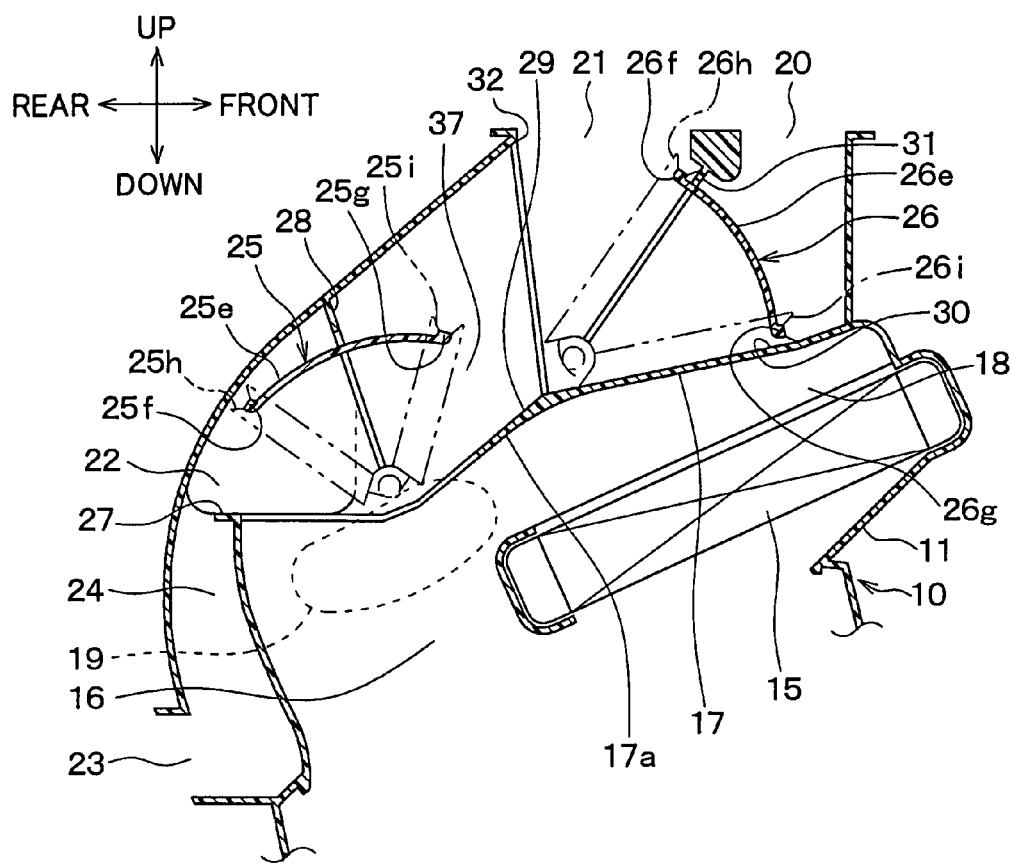
FIG. 4 is a cross-sectional view showing a main part in FIG. 1, in a bi-level mode.

FIG. 4 shows a state of a bi-level mode in which the first rotary door 25 is turned clockwise by a predetermined angle from the position shown in FIG. 1. In this state, the rear seal part 25h of the first rotary door 25 is positioned at a middle position between the case side seal surfaces 27, 28 at the front and back of the front seat side foot openings 22, 22.

Thus, the passages of the front seat side foot openings 22, 22 and the communication passage 37 are brought into a half-open state. On the other hand, the second rotary door 26 keeps the position shown in FIG. 1 as it is, so the defroster opening 20 is kept in a completely closed state and the face opening 21 is kept in a fully opened state.

Accordingly, air from the air mixing portion 19 flows to the passages of the front seat side foot openings 22, 22 and at the same time passes through the communication passage 37 and flows also into the face opening 21. In this manner, it is possible to blow off air toward the feet of the passengers on the front seat and the rear seat through the front seat side foot openings 22, 22 and the rear seat side foot opening 23 and at the same time, to blow off air toward the upper half body of the passenger from the face opening 21.

The bi-level mode is used mainly in a middle temperature season of spring and autumn. For this reason, the air mixing door 14 is operated to a middle turning position between the maximum cooling position shown by the solid line in FIG. 1 and the maximum heating position shown by the double dot and dash line in FIG. 1 to adjust the air temperature blown into the passenger compartment to a middle temperature range.

The passages of the front seat side foot openings 22, 22 are nearer to the cold air passage 16 than the hot air passage 18. Thus, if the hot air bypass passage 33 shown in FIG. 3 is not formed, cold air in the cold air passage 16 readily flows to the passages of the front seat side foot openings 22, 22 and hot air in the hot air passage 18 readily flows to the face opening 21. In this case, the temperature of air blown off toward the face of the passenger is higher than the temperature of air blown off toward the feet of the passenger. As a result, air conditioning feeling in the bi-level mode is deteriorated.

In contrast to this, according to the embodiment, because the hot air bypass passage 33 shown in FIG. 3 is provided, hot air in the hot air passage 18 can directly be introduced into the passages of front seat side foot openings 22, 22. Thus, the volume of cold air flowing to the passages of the front seat side foot openings 22, 22 from the cold air passage 16 can be reduced, and the volume of hot air flowing to the passages of the face openings 21 from the hot air passage 18 can be reduced.

Thus, the volume of cold air flowing toward the face opening 21 can be increased, and there can be provided a comfortable up/down air temperature distribution of a type of keeping passenger's head cool and feet warm by making the temperature of air blown off toward the face of the passenger lower than the temperature of air blown off toward the feet of the passenger. Thus, even in an arrangement in which the passages of the front seat foot openings 22, 22 are nearer to the cold air passage 16 than the hot air passage 18, air conditioning feeling in the bi-level mode can be improved.

Next, FIG. 5 shows a state in a foot mode. In the foot mode, the first rotary door 25 is further turned clockwise by a predetermined angle from the position shown in FIG. 4, so that both the seal parts 25h, 25i of the first rotary door 25 are elastically pressed onto the case side seal surfaces 28, 29 at the front and back of the communication passage 37, respectively. As a result, by the first rotary door 25, the communication passage 37 is brought into a closed state and the passages of the front seat side foot openings 22, 22 on the left and right sides are brought into a fully opened state.

Because the defroster opening 20 and the face opening 21 are arranged on the downstream side of the communication passage 37, both the openings 20, 21 are brought into a closed state irrespective of the rotation position of the second rotary door 26. Here, the second rotary door 26 is anticlockwise turned by a predetermined angle from the position shown in FIG. 4 in synchronization with the rotational displacement of the first rotary door 25. With this arrangement, both the seal parts 26h, 26i of the second rotary door 26 are elastically pressed onto the case side seal surfaces 32, 31 at the front and back of the face opening 21, respectively, so the face opening 21 is completely closed and the defroster opening 20 is fully opened.

Also in this case, the inside space of the first rotary door 25 serves as an air passage for flowing air from the air mixing portion 19 toward the front seat side foot openings 22, 22. Thus, air from the air mixing portions 19 flows directly to the front seat side foot openings 22, 22, and is introduced into the inside space of the first rotary door 25 toward the front seat side foot openings 22, 22.

The foot mode is used for blowing off hot air toward the feet of the passengers mainly in a heating operation. When the air mixing door 14 is operated to the position shown by a double dot and dash line in FIG. 1, a maximum heating state can be set in which the inlet air passage 15a of the heater core 15 is fully opened and in which the cold air passage 16 is completely closed. With this operation of the air mixing door 14, the whole volume of air is heated by the heater core 15 to make it hot air and this hot air can be blown off toward the feet of the passengers on the front seat and the rear seat through the front seat side foot openings 22, 22 and the rear seat side foot opening 23.

By turning the air mixing door 14 anticlockwise from the position shown by the double dot and dash line in FIG. 1, the cold air passage 16 is opened. For this reason, by adjusting the turning position of the air mixing door 14, the air volume ratio between hot air and cold air flowing into the air mixing portion 19 is adjusted, and the temperature of air blown off toward the feet of the passenger can be adjusted to an arbitrary temperature.

Figure 6:
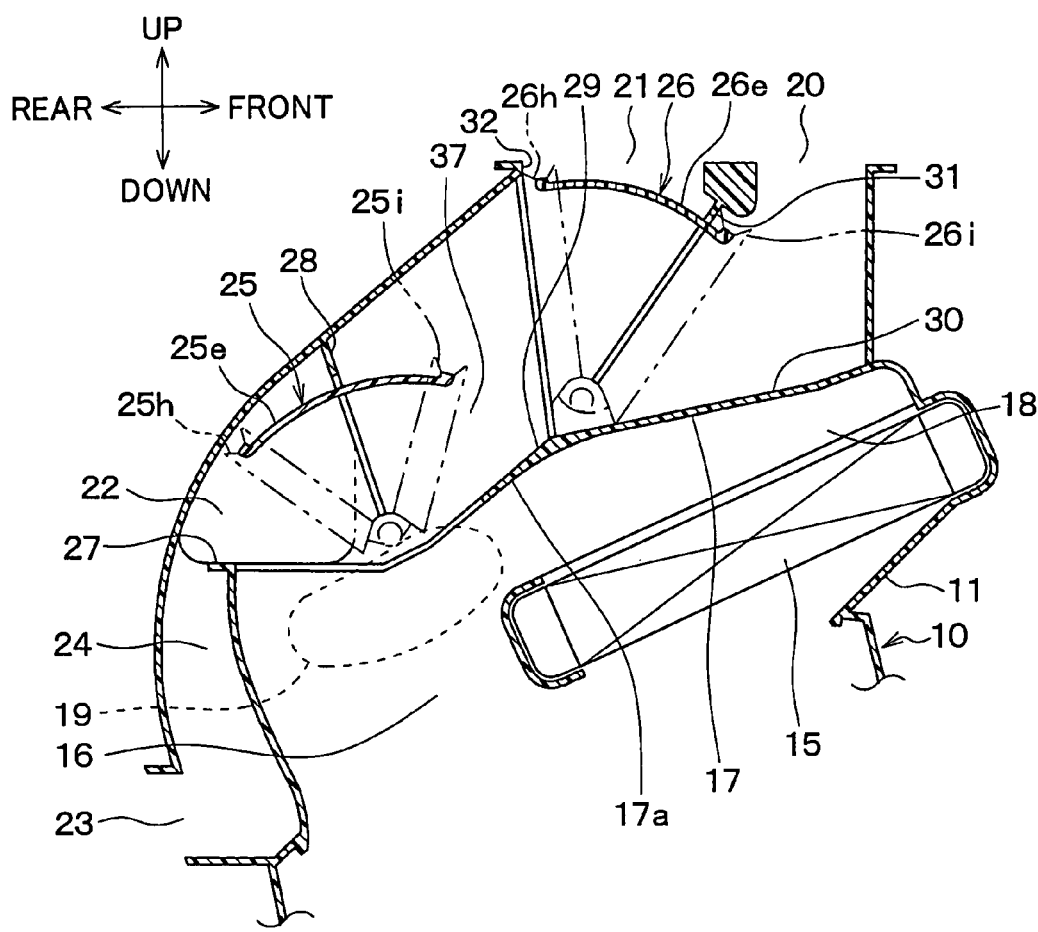
FIG. 6 is a cross-sectional view showing a main part in FIG. 1, in a foot/defroster mode.

Next, FIG. 6 shows a state in a foot/defroster mode. The first rotary door 25 is turned anticlockwise by a predetermined angle from the position shown in FIG. 5, thereby being moved to the same position as in the bi-level mode shown in FIG. 4. Thus, both of the passages of the front seat side foot openings 22, 22 and the communication passage 37 are brought into a half-open state by the first rotary door 25. On the other hand, the second rotary door 26 is kept at the position shown in FIG. 5 as it is, so the defroster opening 20 is kept in a fully opened state and the face opening 21 is kept in a completely closed state.

Thus, air from the air mixing portion 19 flows into the passages of the front seat side foot openings 22, 22 and at the same time flows through the communication passage 37 and the inside space of the second rotary door 26 also into the defroster opening 20. Thus, it is possible to blow off air toward the feet of the passengers on the front seat and the rear seat through the front seat side foot openings 22, 22 and the rear seat side foot opening 23, and at the same time, to blow off air toward the inside surface of the front windshield of the vehicle through the defroster opening 20. This air blown to the inside surface of the front windshield of the vehicle can prevent fogging of the front windshield of the vehicle.

Also in this foot/defroster mode, by using the hot air bypass passage 33 shown in FIG. 3, hot air in the hot air passage 18 can directly be introduced into the passages of the front seat side foot openings 22, 22, so the volume of hot air flowing toward the defroster opening 20 side from the hot air passage 18 can be decreased. Therefore, the volume of cold air flowing toward the defroster opening 20 can be increased and hence there is provided a comfortable up/down air temperature distribution of the type of keeping the passenger's head cool and feet warm by making the temperature of air blown off from the defroster opening 20 lower than the temperature of air blown off from the foot openings 22. Thus, air conditioning feeling in the foot/defroster mode can be improved in the same way as in the bi-level mode.

Figure 7:
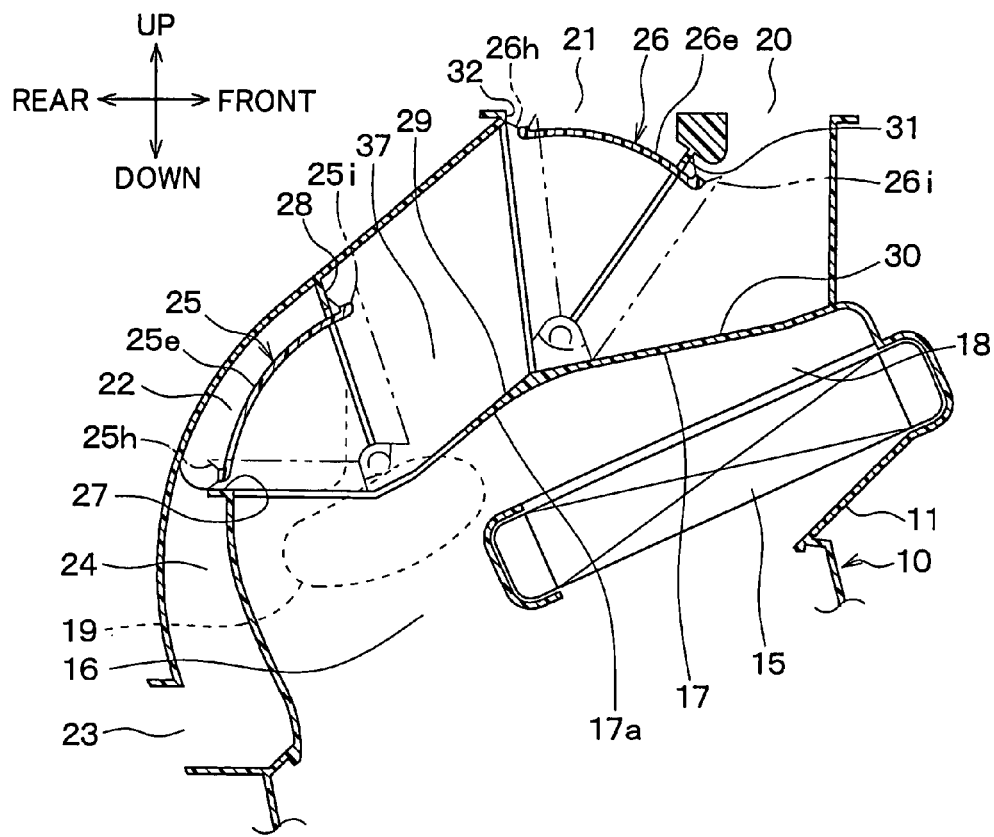
FIG. 7 is a cross-sectional view showing a main part in FIG. 1, in a defroster mode.

Next, FIG. 7 shows a state in a defroster mode. In the defroster mode, the first rotary door 25 is further turned anticlockwise by a predetermined angle from the position shown in FIG. 6, thereby being moved to the same position as in the face mode shown in FIG. 1. Thus, by the first rotary door 25, the passages of the front seat side foot openings 22, 22 are completely closed and the communication passage 37 is fully opened. On the other hand, the second rotary door 26 is kept at the position shown in FIG. 6 as it is, so the defroster opening 20 is kept in a fully opened state and the face opening 21 is kept in a completely closed state.

Thus, the air passage on the air mixing portion 19 side communicates with only the defroster opening 20 through the communication passage 37 and the inside space of the second rotary door 26. Thus, the whole volume of air from the air mixing portion 19 is blown off toward the inside surface of the front windshield of the vehicle to increase a defogging capacity of the front windshield of the vehicle in a maximum level.

According to the first embodiment of the present invention, because the first and second rotary doors 25, 25 are used as doors for selecting the air outlet modes, a force required to select the air outlet modes can be reduced. That is, in the first and second rotary doors 25, 26, because the outer peripheral surfaces 25e, 26e are turned around the rotary shafts 25a, 25b, 26a, 26b in a direction perpendicular to an air flow to open or close the respective openings 20, 21, 22, the outer peripheral door surfaces 25e, 26e neither need to be turned against the air flow as in the case of the cantilever plate door nor undergoes influence of the self weight of the door.

Further, the lip seal type seal parts 25h, 25i, 26h, 26i of the first and second rotary doors 25, 26 are pressed onto the case side seal surfaces 27 to 32 only when the first and second rotary doors 25, 26 are brought to the positions where the respective openings 20, 21, 22 are completely closed. While the first and second rotary doors 25, 26 are being turned, the lip seal type seal parts 25h, 25i, 26h, 26i are separated from the case side seal surfaces 27 to 32, so sliding friction is not caused on the seal parts by turning the first and second rotary doors 25, 26. Thus, it is possible to effectively reduce an operating force required to select the air outlet mode as compared with an air outlet mode door using a cantilever plate door.

Still further, the first rotary door 25 is shaped like the gate by the outer peripheral door surface 25e and the side plates 25c, 25d, and the rotary shafts 25a, 25b are arranged in such a way as to protrude outside in the left and right direction. Similarly, the second rotary door 26 is shaped like the gate by the outer peripheral door surface 26e and the side plates 26c, 26d, and the rotary shafts 26a, 26b are arranged in such a way as to protrude outside in the left and right direction. Thus, the spaces inside the first and second rotary doors 25, 26 have no protruding portion preventing the air flow formed therein and hence can be used, just as they are, as passages through which air flows to the respective openings 20, 21, 22. Therefore, as compared with an air-outlet mode door using a butterfly door, the first and second rotary doors 25, 26 according to this embodiment can reduce the air flow resistance and increase the volume of air blown off from the respective openings 20, 21, 22 and reduce air blast noises (whizzing noises in the air).

According to the first and second rotary doors 25, 26 of the first embodiment of the present invention, a phenomenon in which cold air is separated from hot air as in the case with the butterfly door is not caused. Therefore, it is possible to reduce variations in the temperature of air blown off from the respective openings 20, 21, and 22. The first rotary door 25 is formed into the gate shape constructed with the outer peripheral door surface 25e and the side plates 25c, 25d.

The first rotary door 25 opens and closes the air passage between the gate-shaped inside space and its outside space. Therefore, the opening 22 can be arranged on both of the outer peripheral side of the outer peripheral door surface 25e and the left and right sides of the side plates 25c, 25d. Similarly, the second rotary door 26 is formed into the gate shape constructed with the outer peripheral door surface 26e and the side plates 26c, 26d. The second rotary door 26 opens and closes the air passage between the gate-shaped inside space and its outside space. Therefore, the openings 20, 21 can be arranged on both of the outer peripheral side of the outer peripheral door surface 26e and the left and right sides of the side plates 26c, 26d. To be more specific, the left and right foot openings 22, 22 can be arranged on the outsides in the left and right direction of the side plates 25c, 25d of the first rotary door 25.

Thus, the upstream air passage of the first rotary door 25 can be made to communicate in line with the left and right foot openings 22, 22 to effectively reduce pressure loss caused by a bent passage to the foot openings 22, 22. Therefore, the volume of air blown off toward the feet of the passengers can be increased.

The air-outlet mode selecting mechanism is provided with the two first and second rotary doors 25, 26. Further, the first rotary door 25 opens and closes the foot openings 22, 22 and the second rotary door 26 opens and closes the defroster opening 20 and the face opening 21. Thus, the foot openings 22, 22 can independently be formed in arbitrary positions without regard to the turning path of the outer peripheral door surface 26e of the second rotary door 26 (that is, positions where the defroster opening 20 and the face opening 21 are arranged).

In addition, the first and second rotary doors 25, 26 can be gradually reduced in size as compared with a single rotary door for opening and closing all three air outlet openings 20, 21, 22. Combined with the above-described features, it is possible to improve the mounting performance of the air conditioning unit in the vehicle.

Because hot air in the hot air passage 18 can directly be introduced into the passages of the front seat side foot openings 22, 22 by using the hot air bypass passage 33 shown in FIG. 3, it is possible to provide a comfortable up/down air temperature distribution of the type of keeping passenger's head cool and feet warm. This air temperature distribution is obtained by making the temperature of air blowing off from the face opening 21 in the bi-level mode or the temperature of air blown off from the defroster opening 20 in the foot/defroster mode lower than the temperature of air blown off from the foot openings 22. Thus, even in the arrangement in which the passages of the front seat side foot openings 22, 22 are nearer to the cold air passage 16 than the hot air passage 18, it is possible to improve the air conditioning feeling in the bi-level mode and in the foot/defroster mode.

In the above-described first embodiment, a case where the rear seat side foot opening 23 is provided in addition to the front seat side foot openings 22, 22 has been described. However, the present invention can be put into practice in the same way also in a case where the rear seat side foot opening 23 is not provided but only the front seat side foot openings 22, 22 are provided.

Second Embodiment

The second embodiment of the present invention will be now described with reference to FIGS. 8 and 9.

In the above-described first embodiment, a region where the first rotary door 25 is turned and a region where the second rotary door 26 is turned are set independently from each other. However, in the second embodiment, any one of the first and second rotary doors 25, 26 is arranged in a stacked manner inside the other rotary door. In this manner, the region where the first rotary door 25 is turned partially overlaps the region where the second rotary door 26 is turned.

Figure 8:
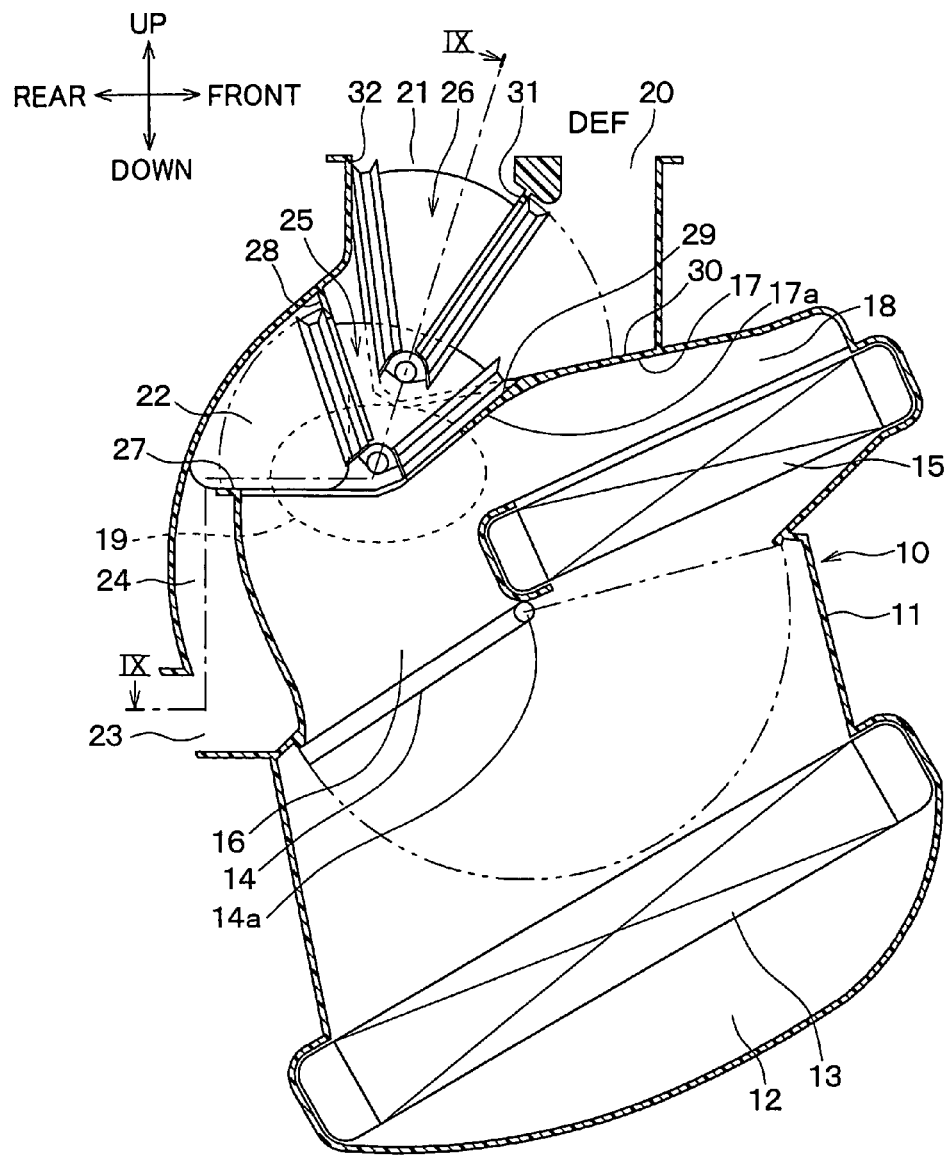
FIG. 8 is a longitudinal cross-sectional view of an air conditioning unit in a foot mode, in accordance with a second embodiment of the present invention.
Figure 9:
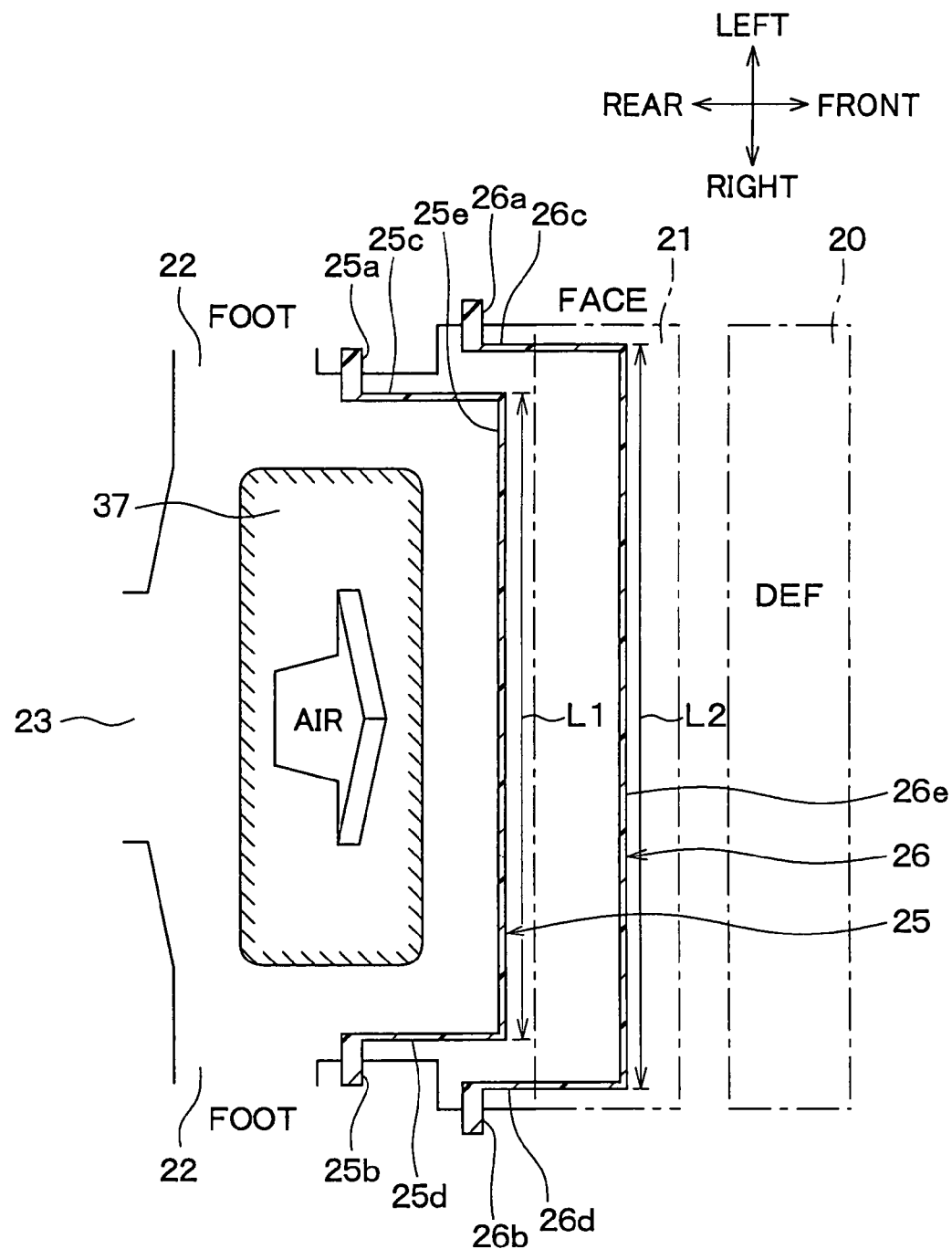
FIG. 9 is a cross-sectional view taken on the line IX-IX in FIG. 8, showing a structure in which two rotary doors are stacked.

FIG. 8 and FIG. 9 show the second embodiment. FIG. 9 is a cross-sectional view taken on the line IX-IX in FIG. 8. A length L1 in an axial direction of the outer peripheral door surface 25e of the first rotary door 25 is made a specified length shorter than a length L2 in the axial direction of the outer peripheral door surface 26e of the first rotary door 26. Thus, the gate-shaped first rotary door 25 constructed of the outer peripheral door surface 25e and the left and right side surfaces 25c, 25d is arranged in an inside space of the gate-shaped second rotary door 26 constructed of the outer peripheral door surface 26e and the left and right side surfaces 26c, 26d.

To be more specific, as shown in FIG. 8, the first rotary door 25 is located at a lower position in the vertical direction of the vehicle and the second rotary door 26 is located at an upper position in the vertical direction of the vehicle, whereby the first and second rotary doors 25, 26 are arranged in a stacked manner. With this arrangement, the rotary shafts 25a, 25b of the first rotary door 25 are located at lower positions in the vertical direction of the vehicle and the rotary shafts 26a, 26b of the second rotary door 26 are located at upper positions in the vertical direction of the vehicle.

According to the second embodiment, the total rotational operation region of both the first and second rotary doors 25, 26 can be reduced as compared with that of the first embodiment. Therefore, the positions where the defroster opening 20 and the face opening 21 are formed can be set near to the position where the front seat side foot openings 22, 22 are formed. This arrangement can reduce the whole size of the air conditioning unit 10 and can further improve the mounting performance of the air conditioning unit 10 in the vehicle.

Although not shown in FIG. 9, also in the second embodiment in the same way, by providing the hot air bypass passage 33 in the first embodiment, hot air in the hot air passage 18 can directly be introduced into the passages of the front seat side foot openings 22, 22.

Third Embodiment

Figure 10:
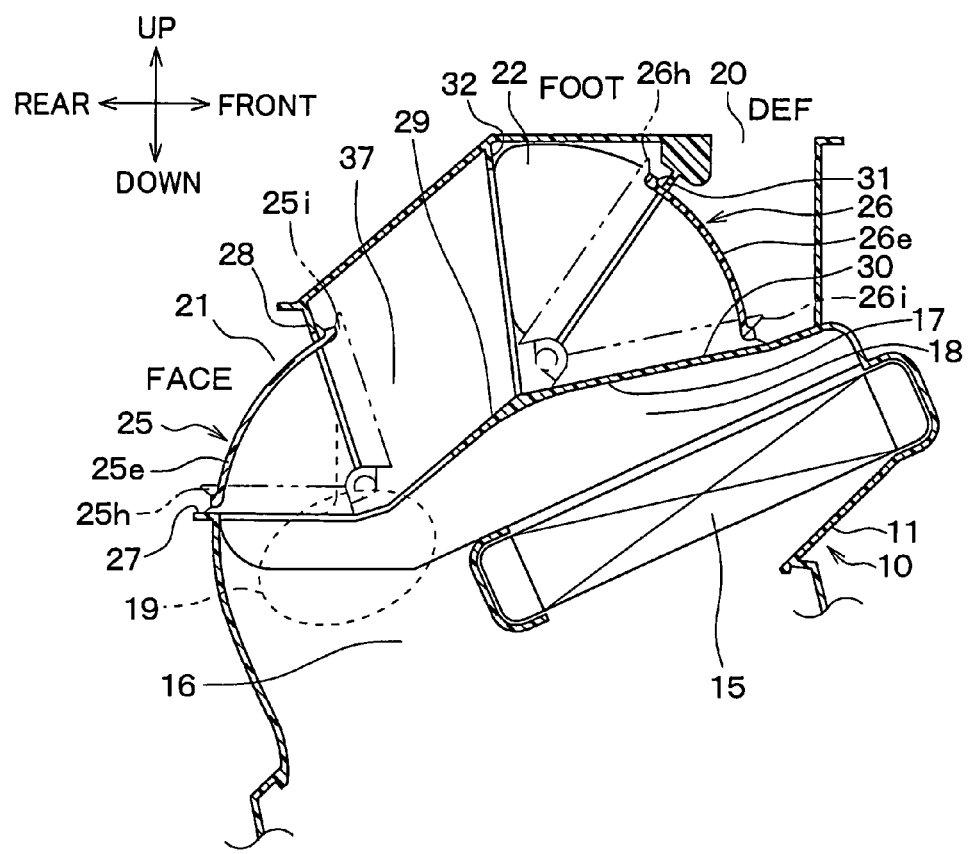
FIG. 10 is a cross-sectional view showing a main part of an air conditioning unit in accordance with a third embodiment of the present invention.

The third embodiment of the present invention will be now described with reference to FIG. 10. The third embodiment is different in the arrangement of the air outlet openings 20, 21, 22 from the first and second embodiments. That is, in the third embodiment, as shown in FIG. 10, the foot openings 22 are arranged at portions near the uppermost portions of the left and right side walls of the case 11 and on the rear side of the vehicle of the defroster opening 20. In addition, the face opening 21 is arranged at a portion adjacent to the air mixing portion 19 of the wall surface on the rear side of the vehicle of the case 11.

In the air conditioner for a vehicle, an air-outlet mode is usually selected in the order of (1) face mode→(2) bi-level mode (3) foot mode→(4) foot/defroster mode→(5) defroster mode, relative to the operating direction of the actuator mechanism or the manual operation mechanism of the air-outlet mode door operation mechanism.

According to the third embodiment, the respective openings are arranged in the order of the face opening 21→the foot opening 22→the defroster opening 20 from the upstream side to the downstream side in the air flow of the case 11. Thus, when the air-outlet mode is selected from (1) to (5), the first rotary door 25 is turned in the following order. That is, the first rotary door 25 is turned in the following manner: (1) in the face mode, the face opening 21 is in the full-open state and the communication passage 37 is in the completely closed state; next, (2) in the bi-level mode, the face opening 21 and the communication passage 37 are brought to a half-open state; next, (3) in the foot mode, the face opening 21 is brought to a completely closed state and the communication passage 37 is brought to a full-open state; further, (4) in the foot/defroster mode, the same opening positions as in the foot mode are held; and (5) in the defroster mode, the same opening positions as in the foot mode are held.

Similarly, the second rotary door 26 is turned in the following manner: (1) in the face mode, the foot opening 22 is brought to a full-open state and the defroster opening 20 is brought to a completely closed state; next, (2) in the bi-level mode, the same positions as in the face mode openings are held; next, (3) in the foot mode, the same opening positions as in the face mode are held; further, (4) in the foot/defroster mode, the foot opening 22 and the defroster opening 20 are brought to a half-open state; and (5) in the defroster mode, the foot opening 22 is brought to a completely closed state and the defroster opening 20 is brought to a full-open state.

According to the third embodiment, the first rotary door 25 is turned by one half of its total rotational angle in the order of the full-open state→the half-open state→the totally closed state of the face opening 21. Then, after the first rotary door 25 is brought to the state where the face opening 21 is totally closed, that is, after the operation is switched to the foot mode, the second rotary door 26 is turned by one half of its total rotational angle in the order of the full-open state→the half-open state→the totally closed state of the foot opening 22.

Thus, the first and second rotary doors 25, 26 are turned by the one half of the respective total rotational angles at shifted timings. Thus, this can effectively reduce the force required to turn the first and second rotary doors 25, 26.

Fourth Embodiment

Figure 11:
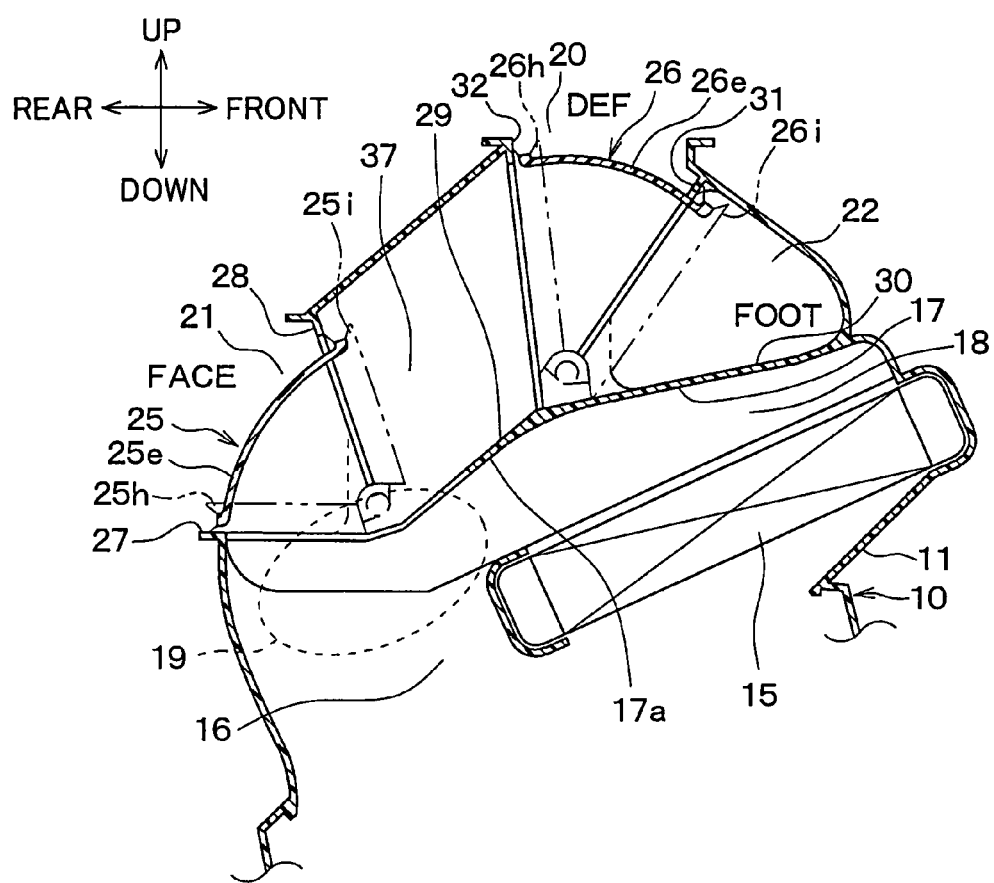
FIG. 11 is a cross-sectional view showing a main part of an air conditioning unit in accordance with a fourth embodiment of the present invention.

The fourth embodiment of the present invention will be now described with reference to FIG. 11. In the fourth embodiment, the arrangement of the air outlet openings 20, 21, 22 is further changed as compared with that of the third embodiment. That is, in the fourth embodiment, as shown in FIG. 11, the foot opening 22 is arranged on the front side of the vehicle of the defroster opening 20.

According to the fourth embodiment, hot air in the hot air passage 18 is U-turned at the tip bent portion 17a of the hot air guide wall 17, and then is pushed by the cold air flow from the cold air passage 16, thereby easily flowing to the foot opening 22 on the front side of the vehicle. On the other hand, because the face opening 21 is provided adjacent to the cold air passage 16, cold air in the cold air passage 16 originally easily flows to the face opening 21.

For this reason, in the fourth embodiment, even if the hot air bypass passage 33 of the first embodiment is not provided, it is possible to provide the comfortable up/down air temperature distribution of the type of keeping the passenger head cool and feet warm in the bi-level mode and in the foot/defroster mode.

Fifth Embodiment

The fifth embodiment of the present invention will be now described with reference to FIGS. 12-14. In the vehicle air conditioner, typically, the face opening 21 is divided into a center face opening and a side face opening. The center face opening is connected to a center face air outlet port located at the center in the left and right direction of the instrument panel of the vehicle, and the side face opening is connected to side face air outlet ports located near the left and right side ends of the instrument panel of the vehicle. By keeping the side face opening at an open state in all air outlet modes, conditioned air can always be blown off from the side face air outlet ports. Accordingly, in the foot mode, the foot/defroster mode and the defroster mode which are mainly used in winter, hot air is blown off to the side windshields of the vehicle from the side face air outlet ports so as to prevent the portion near to the windshield of the upper half body of the passenger from feeling cold by the radiation of cold heat from the windshield at a low temperature, and to perform a defogging function of the side windshields.

In the above-described first embodiment, in the foot mode shown in FIG. 5, by the first rotary door 25, the foot openings 22 are fully opened and the communication passage 37 is totally closed. For this reason, even if the face opening 21 is divided into the center face opening and the side face opening, a part of conditioned air cannot be branched to the side face opening.

Then, it is thought to take a measure of turning the first rotary door 25 anticlockwise by a small amount of rotational angle from the totally closed position of the communication passage 37 (position shown in FIG. 5) to open a part of the communication passage 37. It is also thought to take another measure of turning the second rotary door 26 clockwise by a small amount of rotational angle from the totally closed position of the face opening 21 (position shown in FIG. 5) to open a part of the face opening 21. According to these measures, a part of conditioned air flows to both of the center face opening and the side face opening of the face opening 21. Thus, in the foot mode, hot air passes through the center face opening and is blown off also from the center face air outlet port. Therefore, the passenger feels hot at his face, and these measures can not be put into practice.

The object of the fifth embodiment is to keep the side face opening of the face opening 21 at the open state in all air outlet modes in the air-outlet mode selecting mechanism for opening and closing the defroster opening 20, the face opening 21 and the foot opening 22 by the combined use of the first and second rotary doors 25, 26.

Figure 12:
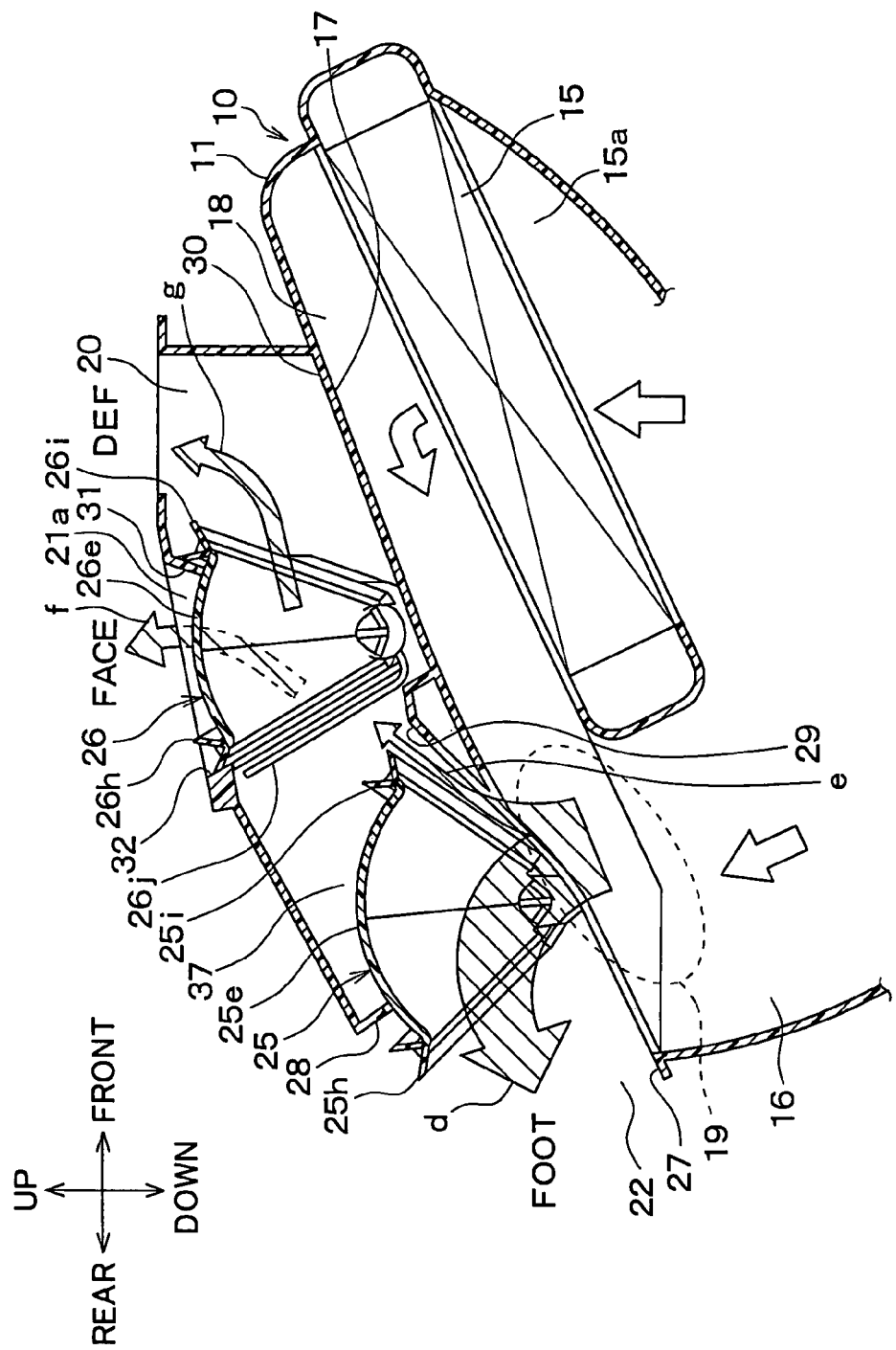
FIG. 12 is a cross-sectional view showing a main part of an air conditioning unit in accordance with a fifth embodiment of the present invention.

FIG. 12 to FIG. 14 show the fifth embodiment of the present invention. The fifth embodiment has the same arrangement of the defroster opening 20, the face opening 21 and the foot opening 22 as the above-described first embodiment. Thus, in the fifth embodiment, similarly to the above-described first embodiment, the foot opening 22 and the communication passage 37 are opened and closed by the first rotary door 25, and the defroster opening 20 and the face opening 21 are opened and closed by the second rotary door 26. Here, FIG. 13 is a top view of the left half portion of the air conditioning unit 10 (case 11) and FIG. 14 shows a left half portion of the second rotary door 26, corresponding to the left half portion of the air conditioning unit 10.

In the fifth embodiment, the face opening 21 is divided into a center face opening 21a located at the center in the width direction of the vehicle and side face openings 21b located on the left and right sides of the center face opening 21a in the top surface of the case 11.

The side face openings 21b on both of the left and right sides are separated from the center face opening 21a by a partition wall 21c, and conditioned air from the air mixing portion 19 flows through the communication passage 37 and then independently flows to the center face opening 21a and the side face openings 21b.

The center face opening 21a is connected to a center face air outlet port located at the center in the width direction of the instrument panel of the vehicle via a center face duct (not shown). Then, the side face openings 21b are connected to side face air outlet ports located near left and right side ends of the instrument panel of the vehicle via a side face duct (not shown).

It is illustrated in FIG. 12 and FIG. 13 that the foot opening 22 is directly open to the passenger compartment. However, actually, a foot duct (not shown) is connected to the foot opening 22 and guides air in the foot opening 22 downward to the left and right sides of the case 11.

Figure 14B:
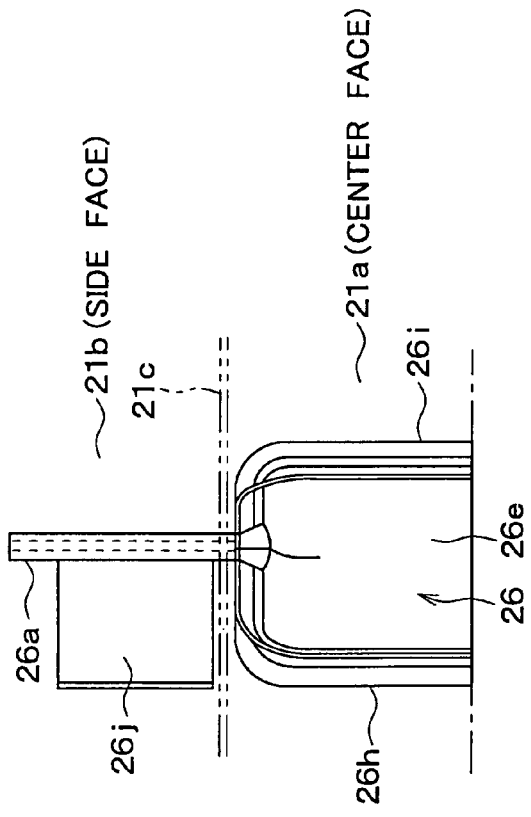
FIGS. 14A, 14B, 14C are a partial perspective view, a partial top plan view, and a cross-sectional view of the structure of the second rotary door in accordance with the fifth embodiment, respectively.
Figure 14C:
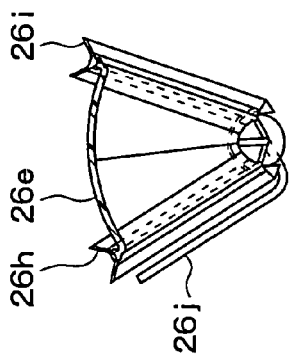
Figure 14A:
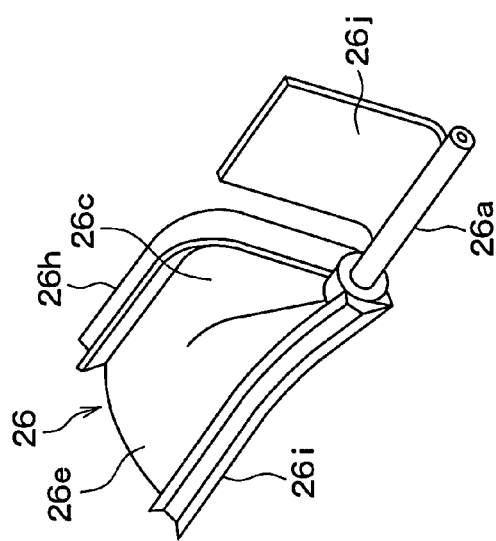

FIGS. 14A to 14C illustrate a specific example of the second rotary door 26 in accordance with the fifth embodiment. The example has the same rotary door structure as the first embodiment in which an arc-shaped outer peripheral door surface 26e, side parts 26c, 26d and seal parts 26h, 26i are provided in the second rotary door 26 at portions corresponding to the center face opening 21a in the width direction of the vehicle.

On the other hand, in the width direction of the vehicle of the second rotary door 26, the above-described elements 26e, 26d, 26h, 26i are not provided at the portions corresponding to the side face openings 21b on the left and right sides, but only the rotary shafts 26a, 26b and an air volume adjusting plate 26j are provided. According to this construction, the side face openings 21b on the left and right sides are not totally closed by the second rotary door 26 but always kept in the open state.

FIG. 14B shows only the left side face opening 21b and does not show the right side face opening 21b, so it does not show the right side part 26d, the right rotary shaft 26b, and the right air volume adjusting plate 26j of the second rotary door 26. However, the right elements can be provided symmetrically to the left elements.

The air volume adjusting plate 26j is provided similarly to a cantilever plate door and is integrally turned with the left and right rotary shafts 26a, 26b of the second rotary door 26 to change the passage areas of the left and right side face openings 21b. Therefore, an air volume blown from the left and right side face openings 21b can be adjusted in response to a change in the air outlet mode.

FIG. 12 shows the air conditioning unit 10 in the foot mode in accordance with the fifth embodiment. In the foot mode, the first rotary door 25 is operated to a rotational position where the foot opening 22 is nearly fully opened and where the communication passage 37 is slightly opened. Thus, a major part of conditioned air (hot air) from the air mixing portion 19 flows to the foot opening 22 and a part of conditioned air (hot air) from the air mixing portion 19 is branched to the communication passage 37 as shown by the arrow "e".

At this time, the second rotary door 26 is turned to the position shown in FIG. 12 where the seal parts 26h, 26i are pressed onto the case side seal surfaces 31, 32 located at the front and back sides of the center face opening 21a to totally close the center face opening 21a. In contrast to this, because the portion of the second rotary door 26, corresponding to the side face openings 21b, are not provided with seal parts 26h, 26i, the side face openings 21b on the left and right sides are not totally closed by the second rotary door 26 but are always kept at the open state.

Thus, the conditioned air branched to the communication passage 37 flows into the side face openings 21b on the left and right sides as shown by the arrow "f" and passes through the side face openings 21b on the left and right sides and then is blown off from the side face air outlet ports (not shown) to the vicinity of the side windshields of the vehicle. This can prevent the portion on the windshield side of the passenger's upper half body from feeling cold by the radiation of cold heat from the windshield at a low temperature. This can also produce an effect of preventing fogging of the side windshields of the vehicle.

According to the fifth embodiment, in the foot mode, because the communication passage 37 communicates with the defroster opening 20 through the inside space of the second rotary door 26, a part of conditioned air flows also to the defroster opening 20 as shown by arrow "g" and is blown off to the front windshield of the vehicle to produce an effect of preventing fogging of the front windshield of the vehicle.

Sixth Embodiment

The sixth embodiment of the present invention will be now described with reference to FIGS. 15-21.

In the above-described fifth embodiment of the present invention, when the conditioned air flows to the side face openings 21b, a part of conditioned air inevitably flows also to the defroster opening 20. However, there is a case where it is requested to improve a heating capability of the passenger's feet in the foot mode by stopping air from blowing off from the defroster opening 20 and by increasing an air volume blown off from the foot opening 22.

Figure 15:
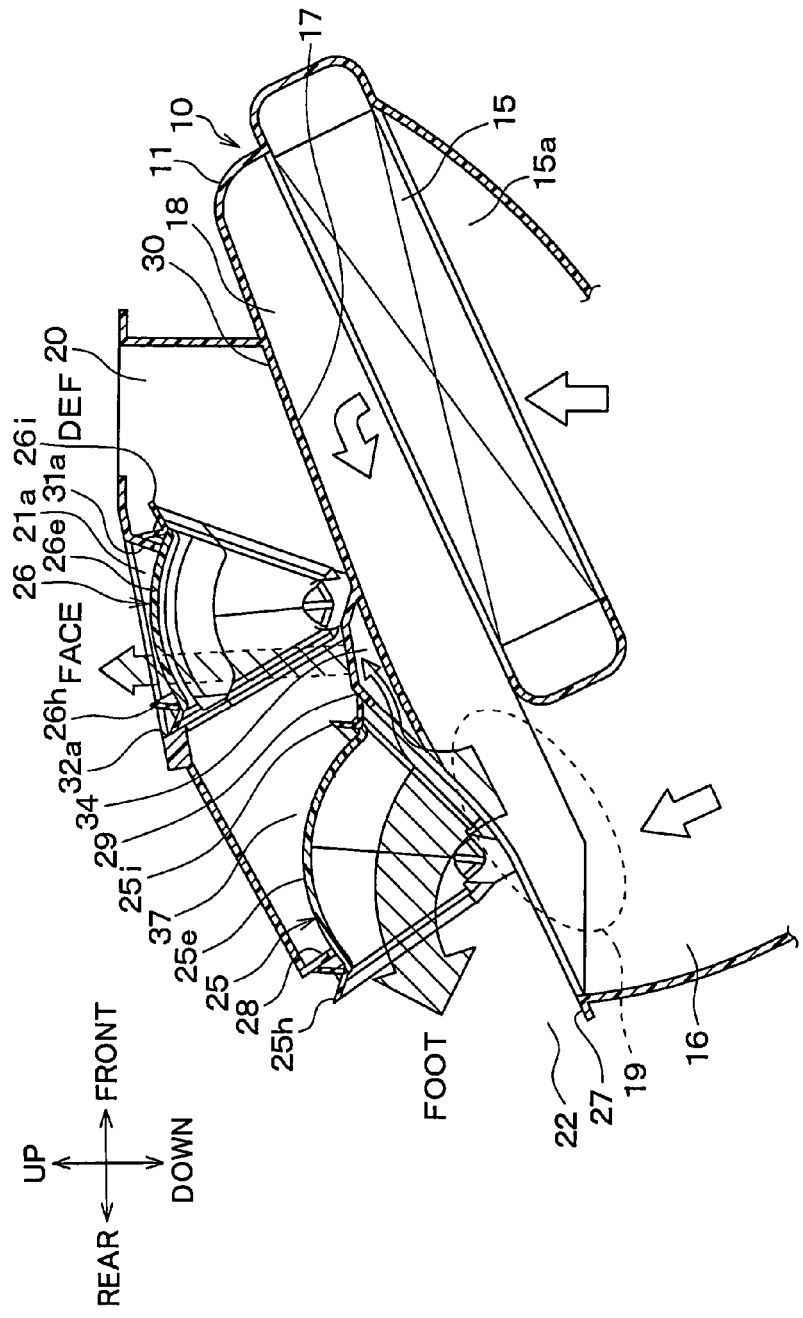
FIG. 15 is a cross-sectional view showing a main part of an air conditioning unit in a foot mode in a state where air does not blow off from the defroster opening, in accordance with a sixth embodiment of the present invention.
Figure 20:
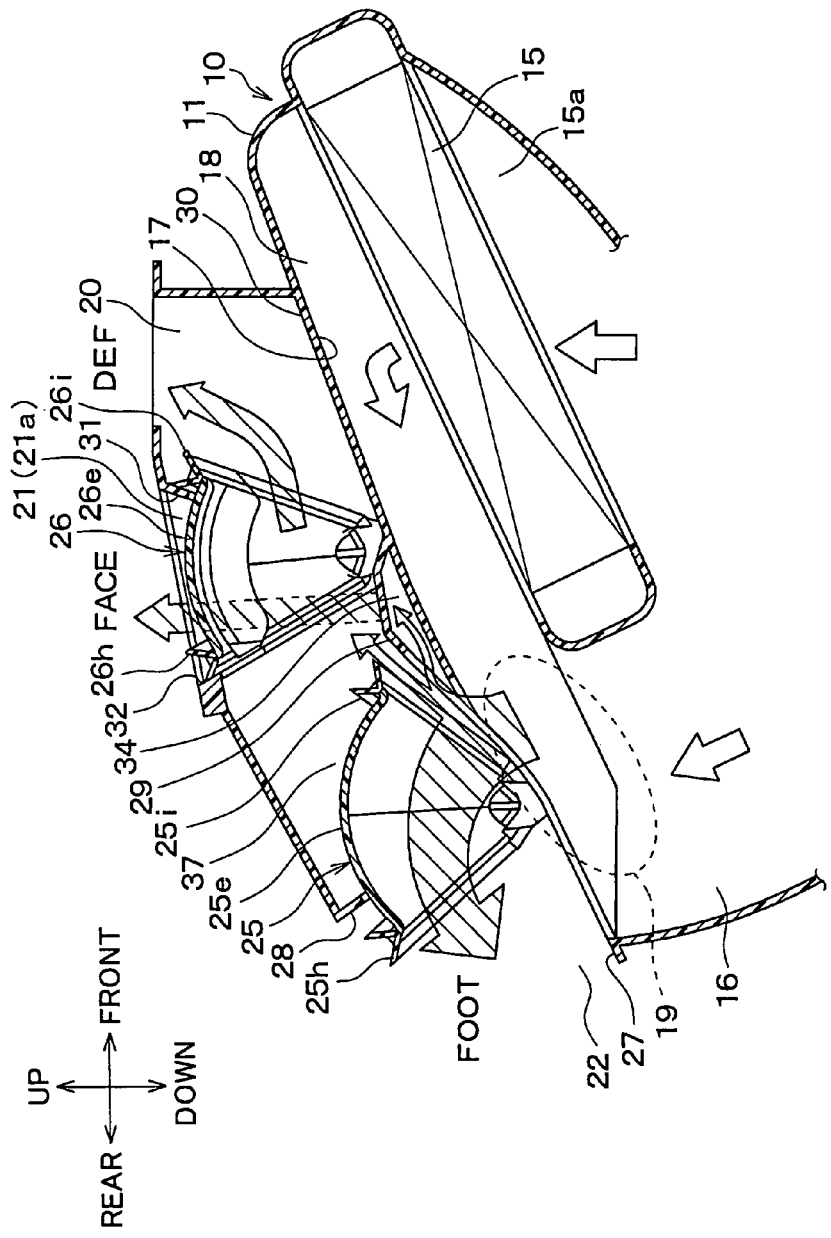
FIG. 20 is a cross-sectional view of a main part of the sixth embodiment and shows a foot mode in a state where air blows off by a small amount from a defroster opening.
Figure 21:
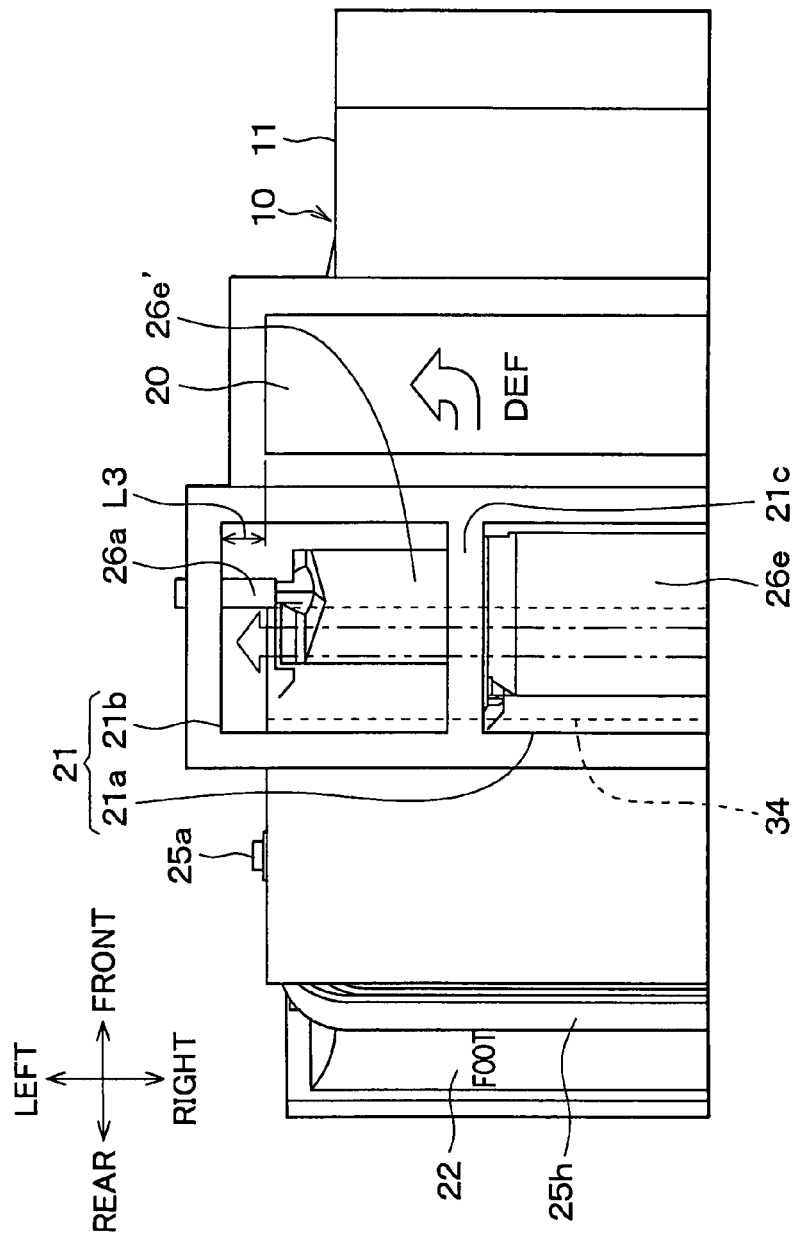
FIG. 21 is a top plan view of the left half portion of the air conditioning unit in accordance with the sixth embodiment and shows a foot mode in a state where air blows off by a small amount from the defroster opening.
Figure 22:
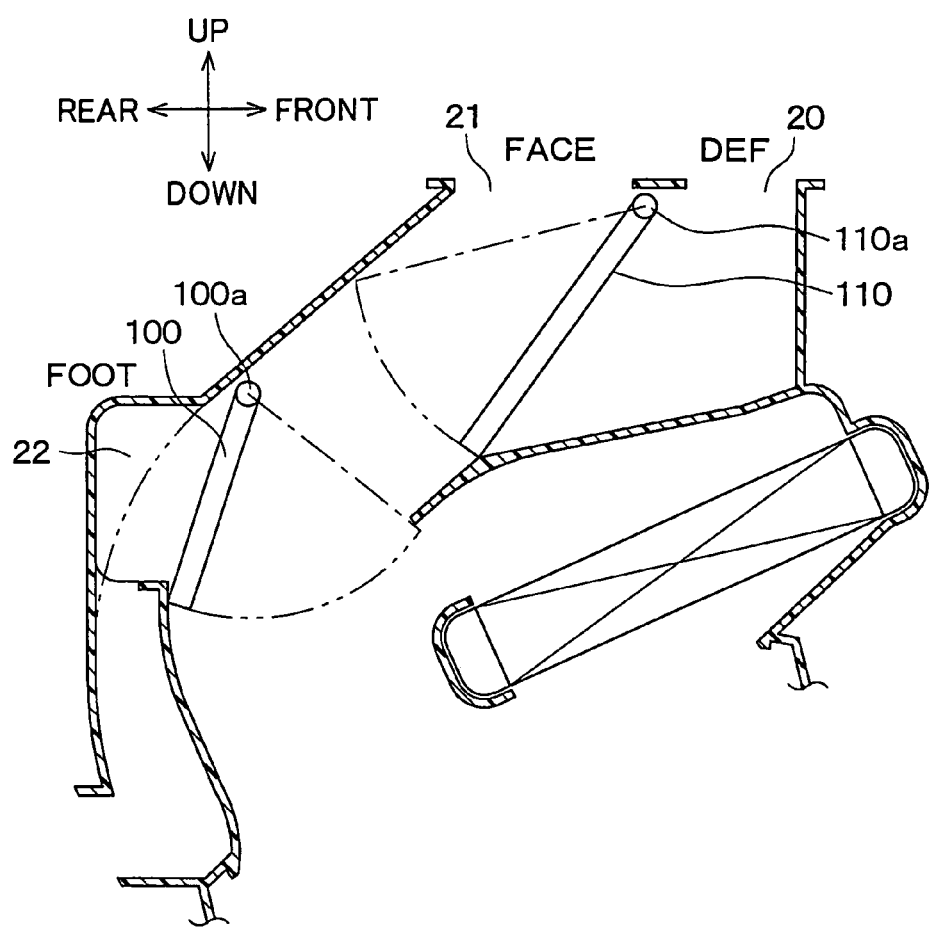
FIG. 22 is a cross-sectional view showing a main part of an air conditioning unit of the related art.
Figure 23:
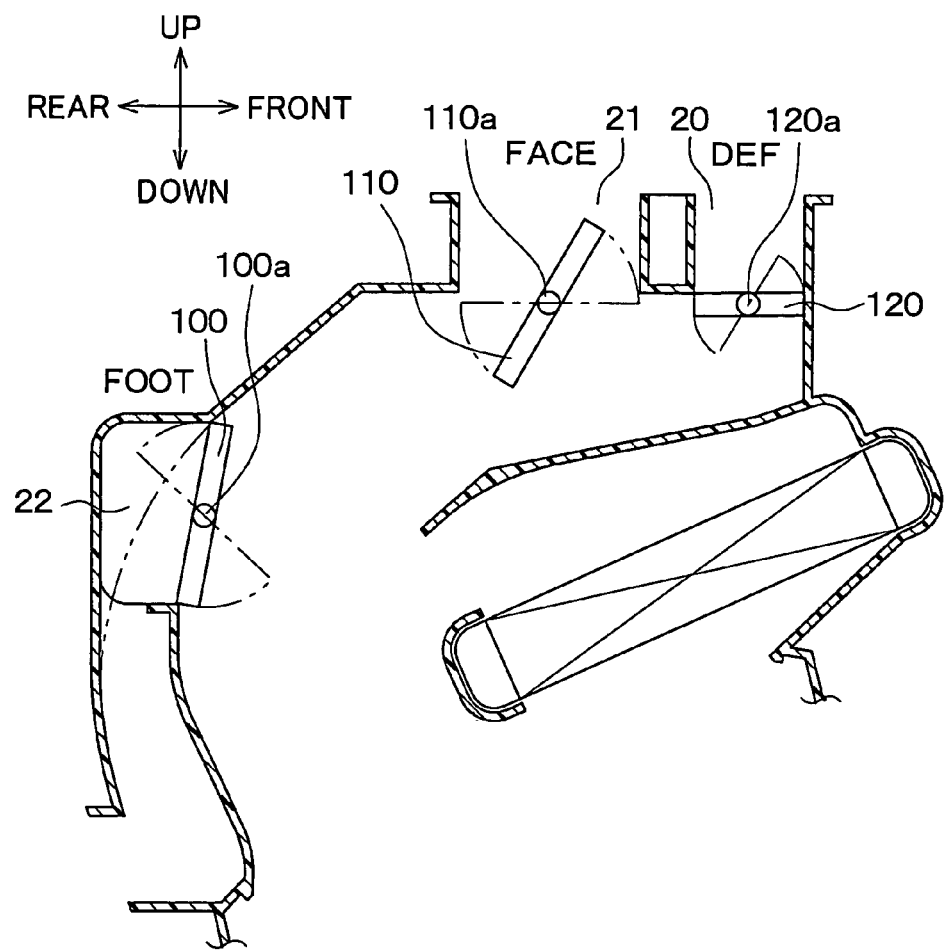
FIG. 23 is a cross-sectional view showing a main part of another air conditioning unit of the related art.

The sixth embodiment responds to such a request and FIG. 15 to FIG. 21 show the sixth embodiment. FIG. 15 and FIG. 16 show a state in the foot mode in which air is stopped from blowing off from the defroster opening 20 in the sixth embodiment, whereas FIG. 20 and FIG. 21 show a state in the foot mode in which air is blown off also from the defroster opening 20 in the sixth embodiment.

Then, FIG. 15 and FIG. 20 correspond to FIG. 12 in the above-described fifth embodiment, FIG. 16 and FIG. 21 correspond to FIG. 13 in the above-described fifth embodiment, and FIGS. 17A to 17C correspond to FIGS. 14A to 14C in the above-described fifth embodiment. FIG. 18 shows a state where the second rotary door 26 is dismounted to clearly show the shapes of the case side seal surfaces 32a, 32b, 31a, 31b in the center face opening 21a and in the side face openings 21b. Then, in contrast to FIG. 18, FIG. 19 shows a state where the second rotary door 26 is mounted and shows the arrangement of the seal parts 26h, 26i of the second rotary door 26.

Hereinafter, different points between the sixth embodiment and the fifth embodiment will mainly specifically be described. The second rotary door 26, as shown in FIGS. 17A to 17C, has a first outer peripheral door surface 26e having a large radius (distance) from the center of the rotary shaft 26a (26b) and a second outer peripheral door surface 26e' having a smaller radius (distance) from the center of the rotary shaft 26a (26b) than the first outer peripheral door surface 26e.

Thus, the second rotary door 26 is formed in the shape having a step part 26k in the radial direction between the first outer peripheral door surface 26e and the second outer peripheral door surface 26e'. The first outer peripheral door surface 26e is arranged in correspondence to the center face opening 21a of the face opening 21 and the second outer peripheral door surface 26e' is arranged in correspondence to the side face openings 21b.

The seal parts 26h, 26i are fixed to the peripheral portions of the first and second outer peripheral door surfaces 26e, 26e', the step part 26k and the side parts 26c (26d).

In the sixth embodiment, as shown in FIG. 16, FIG. 18, FIG. 19, and FIG. 21, the side face openings 21b are formed in such a manner that they protrude outside in the width direction of the vehicle by a specified length L3 from the defroster opening 20 in the top surface of the case 11. Then, the second outer peripheral door surface 26e' of the second rotary door 26 is arranged in correspondence to a range where the defroster opening 20 is formed, among the side face openings 21b. The second outer peripheral door surface 26e' is not arranged in the range of the specified length L3 in the side face openings 21b.

Thus, the case side seal surfaces 32b, 31b in the side face openings 21b, as shown in the shaded areas in FIG. 18, are also formed only in an area corresponding to the range where the defroster opening 20 is formed and are not formed in the range of the specified length L3. In FIG. 18, the case side seal surfaces 32a, 31a in the center face opening 21a are also similarly shown by the shaded portions.

FIG. 19 shows a case where one side seal part 26h of the second rotary door 26 is located on the case side seal surfaces 32a, 32b and that the other one side seal part 26i of the second rotary door 26 is located on the bottom surface side of the case side seal surfaces 31a, 31b. With this, in the range of the specified length L3 of the side face openings 21b, the side face openings 21b always keeps the open state irrespective of the rotational position of the second rotary door 26. The shaded portion in FIG. 19 shows the seal part 26h.

On the other hand, in the case 11, there is provided with a bypass passage 34 through which the upstream side of the first rotary door 25 directly communicates with the range of the above-described length L3 of the side face openings 21b (portion always keeping the open state). This bypass passage 34, to be more specific, is formed between the lower side of the seal surface 29 on the front side of the vehicle among the case side seal surfaces 27, 28, 29 provided in correspondence to the first rotary door 25, and a tip portion on the rear side of the vehicle of the hot air guide wall 17.

That is, a space extending at a predetermined spacing in the width direction of the vehicle is formed between the seal surface 29 on the front side of the vehicle and the tip portion on the rear side of the vehicle of the hot air guide wall 17, and the rear side of the vehicle of this space communicates with the air mixing portion 19. Then, both side end portions in the left and right direction of this space communicate with the portions having the above-described length L3 and being always open among the side face openings 21b on both the left and right sides. In this manner, the bypass passage 34 can be formed. Through this bypass passage 34, the upstream portion (near the air mixing portion 19) of the first rotary door 25 can directly communicate with the always open portions having the above-described length L3 among the side face openings 21b on both the left and right sides.

In the sixth embodiment, it is possible to selectively set a first foot mode without air blown from the defroster opening 20 and a second foot mode having air blown from the defroster opening 20. In the case of the first foot mode, the first rotary door 25 and the second rotary door 26 are operated to the rotational position shown in FIG. 15.

That is, the first rotary door 25 is turned to a position where the foot opening 22 is fully opened and where the communication passage 37 on the upstream side of the second rotary door 26 is totally closed. Then, the second rotary door 26 is turned to a position where both the seal parts 26h, 26i on the front and back sides of the second rotary door 26 are pressed onto the case side seal surfaces 32a, 31a in the center face opening 21a and the case side seal surfaces 32b, 31b in the side face opening 21b, respectively.

With this turning operation, the main stream of air from the air mixing potion 19 is blown to the passenger's feet from the foot opening 22. At the same time, a part of air from the air mixing portion 19 is directly introduced through the bypass passage 34 into the always open portions having the specified length L3 of the left and right side openings 21b. Then, air is introduced into the side face air outlet ports located on the left and right side end portions of the instrument panel from the side face openings 21b on the left and right sides, and is blown off from this air outlet ports to the vicinity of the left and right side windshields.

At this time, because the communication passage is totally closed, air is not blown off from the center face opening 21a and the defroster opening 20. Thus, the first foot mode for blowing air only from the foot opening 22 and the side face openings 21b can be performed.

With this operation of the first foot mode, it is possible to heat the passenger's feet. At the same time, in the first foot mode, by blowing off air from the side face openings 21b, it can prevent the portion on the side windshield side of the passengers upper half body from feeling cold when outside air temperature is low, and further it can prevent fogging of the side windshields.

Next, when the second foot mode where air is blown off from not only the foot opening 22 and the side face openings 21b but also the defroster opening 20 is performed, the first rotary door 25 is turned to the rotational position shown in FIG. 20. That is, the first rotary door 25 is anticlockwise turned by a small angle from the position shown in FIG. 15 to slightly open the communication passage 37 and to nearly fully open the foot opening 22. Here, the second door 26 is kept at the same rotational position shown in FIG. 15.

With this operation of the second foot mode, a part of air from the air mixing portion 19 is branched also to the communication passage 37 and flows through the inside space of the second rotary door 26 and is blown off from the defroster opening 20. Then, a part of air from the air mixing portion 19 is directly introduced into the side face openings 21b through the bypass passage 34 in the same way shown in FIG. 15.

In the second foot mode, because the center face opening 21a is totally closed by the second rotary door 26, air blown from the center face opening 21a is stopped. Thus, it is possible to perform the second foot mode in which air is blown off from not only the foot opening 22 but also the side face openings 21b and the defroster opening 20. With this operation, it is possible to heat the passenger's feet and at the same time, to prevent fogging of the front windshield and the side windshields of the vehicle. Further, it is also possible to prevent the portion adjacent to the side windshield of the passenger's upper half body from feeling cold when outside air temperature is low.

Other Embodiments

Although the present invention has been fully described in connection with the preferred embodiments thereof with reference to the accompanying drawings, it is to be noted that various changes and modifications will become apparent to those skilled in the art.

For example, in the above-described respective embodiments, the outer peripheral door surfaces 25e, 26e, 26e' of the first and second rotary doors 25, 26 are shaped like an arc having its center at the rotary shafts 25a, 25n, 26a, 26b, respectively. However, even if the outer peripheral door surfaces 25e, 26e, 26e' are not shaped like an arc but are shaped like a flat plane, the sealing functions of the rotary doors 25, 26 can be performed by the seal parts 25h, 25i, 26h, 26i. Thus, the outer peripheral door surfaces 25e, 26e, 26e' can be formed into a flat shape.

Further, in the above-described first embodiment, the thermoplastic elastomer is used as the material of the seal parts 25h, 25i, 26h, 26i of the rotary doors 25, 26. Further, when the outer peripheral door surfaces 25e, 26e, the side plates 25c, 25d, 26c, 26d and the rotary shafts 25a, 25b, 26a, 26b, which construct the base part of the rotary doors 25, 26, are molded of resin, the seal parts 25h, 25i, 26h, 26i are integrally molded with them. However, it is also recommended that packing members previously molded of foaming resin or the like be used as the seal parts 25h, 25i, 26h, 26i and may be fixed to the peripheral portions of the base part of the rotary doors 25, 26 with an adhesive or the like.

Still further, the example in which the air mixing door 14 is constructed of the cantilever plate door has been described in the above-described first embodiment. However, needless to say, the air mixing door 14 can be constructed of a sliding door or a flexible film door that does not turn but moves back and forth.

Still further, in the above-described first embodiment, the example in which both the evaporator 13 and the heater core 15 are arranged nearly in the horizontal direction has been described. However, the arrangement of the evaporator 13 and the heater core 15 is not limited to the nearly horizontal arrangement but can be variously modified.

Such changes and modifications are to be understood as being within the scope of the present invention as defined by the appended claims.

What is claimed is:

1. An air conditioner for a vehicle having a passenger compartment, the air conditioner comprising:
    a heat exchanger for performing a heat exchange with air;
    a case accommodating the heat exchanger, for defining an air passage through which air flows into the passenger compartment, the case being provided with a defroster opening through which air flows toward an inner surface of a front windshield of the vehicle, a face opening through which air flows toward an upper side of the passenger compartment, and a foot opening through which air flows toward a lower side of the passenger compartment, at positions downstream from the heat exchanger; and
    a mode selecting device for opening and closing the defroster opening, the face opening and the foot opening, the mode selecting device including first and second rotary doors, wherein:

each of the first and second rotary doors includes a rotation shaft, an outer peripheral door surface separated from a center axial line of the rotation shaft to a radial outside by a predetermined dimension, and two side plates connected to the rotation shaft and end portions of the outer peripheral door surface in an axial direction of the rotation shaft;

the first rotary door is disposed to open one of the defroster opening, the face opening and the foot opening while at least partially closing the other two of the defroster opening, the face opening and the foot opening and to close the one of the defroster opening, the face opening and the foot opening while opening the other two of the defroster opening, the face opening and the foot opening, and the second rotary door is disposed to open and close the other two of the defroster opening, the face opening and the foot opening;

the first rotary door and the second rotary door are located along an air flow direction; and the second rotary door is located downstream from the first rotary door in the air flow direction;

the first rotary door is disposed to open and close the foot opening;

the second rotary door is disposed to open and close the defroster opening and the face opening;

the case includes right and left side wall portions in the axial direction of the shaft;

the foot opening is provided in both of the right and left side wall portions opposite to the side plates of the first rotary door;

the heat exchanger includes a heating heat exchanger for heating air;

the heating heat exchanger is disposed in the case to form a hot air passage through which air passes through the heating heat exchanger and a cold air passage through which air bypasses the heating heat exchanger;

the right and left side wall portions of the case have enlarged portions enlarging the hot air passage to an outside of the right and left sides of the case toward a downstream side of hot air so as to form a hot-air bypass passage; and the foot opening is provided in the right and left side wall portions at a position where the hot-air bypass passage is formed.

2. The air conditioner according to claim 1, wherein:

each of the first and second rotary doors is formed into a gate shape by the outer peripheral door surface and the two side plates to have an inner space of the gate shape, through which air after passing through the heat exchanger flows;

the defroster opening, the face opening and the foot opening are arranged outside of the gate shapes of the first and second rotary doors;

each of the first and second rotary doors is provided with a seal portion on peripheral end portions of the outer peripheral door surface and the two side plates;

the case has seal surfaces each of which is provided around each of the openings; and the seal portion press-contacts the seal surface of the case so that a communication between the inner space of the gate shape and each of the openings is shut.

3. The air conditioner according to claim 2, wherein:

each of the side plates is formed substantially into a fan shape having a pivot; and the rotation shaft is disposed to protrude outside of the side plates from the pivots of the side plates.

4. The air conditioner according to claim 2, wherein:

the rotation shaft is constructed with two shaft parts disposed at the pivots of the side plates and separated from each other in the axial direction; and the shaft parts are disposed to protrude outside substantially in a direction perpendicular to the side plates.

5. The air conditioner according to claim 1, wherein the first and second rotary doors are disposed such that the outer peripheral door surface and the side plates of the second rotary door are arranged inside of the outer peripheral door surface and the side plates of the first rotary door.

6. The air conditioner according to claim 1, wherein each of the first and second rotary doors are disposed in the case such that the side plates are arranged at right and left side of the case in the axial direction.

* * * * *